(12) United States Patent
Hitomi et al.

(10) Patent No.: US 11,242,812 B2
(45) Date of Patent: Feb. 8, 2022

(54) ENGINE CONTROL METHOD AND ENGINE CONTROL DEVICE

(71) Applicant: Mazda Motor Corporation, Hiroshima (JP)

(72) Inventors: Mitsuo Hitomi, Aki-gun (JP); Eiji Nakai, Aki-gun (JP); Naohiro Yamaguchi, Aki-gun (JP); Hiroki Morimoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/964,501

(22) PCT Filed: Jan. 23, 2019

(86) PCT No.: PCT/JP2019/002094
§ 371 (c)(1),
(2) Date: Jul. 23, 2020

(87) PCT Pub. No.: WO2019/151082
PCT Pub. Date: Aug. 8, 2019

(65) Prior Publication Data
US 2021/0033038 A1 Feb. 4, 2021

(30) Foreign Application Priority Data
Jan. 30, 2018 (JP) .............................. JP2018-013277

(51) Int. Cl.
*F02D 41/14* (2006.01)
*F02B 75/02* (2006.01)
(Continued)

(52) U.S. Cl.
CPC .......... *F02D 41/1454* (2013.01); *F02B 75/02* (2013.01); *F02D 41/009* (2013.01);
(Continued)

(58) Field of Classification Search
CPC .... F02D 41/14; F02D 41/1454; F02D 41/009; F02D 41/38; F02B 75/02; F02B 2075/027; F02P 5/15; F02P 21/00
See application file for complete search history.

(56) References Cited

U.S. PATENT DOCUMENTS 6,345,500 B2 * 2/2002 Itou ....................... F02D 41/405
60/286
6,659,073 B1 12/2003 Franke et al.
(Continued)

FOREIGN PATENT DOCUMENTS

DE 19936201 A1 2/2001
DE 102015109928 A1 12/2015
(Continued)

*Primary Examiner* — Hieu T Vo
(74) *Attorney, Agent, or Firm* — Alleman Hall Creasman & Tuttle LLP

(57) ABSTRACT

An engine control method includes: a first fuel supply step of supplying fuel into the combustion chamber using an injector when a spark plug makes flame in the combustion chamber so that an air-fuel mixture is generated at least around the spark plug, the air-fuel mixture having an air-fuel mass ratio A/F or a gas-fuel mass ratio G/F, in which gas includes air, higher than a stoichiometric air-fuel ratio; after the first fuel supply step, an ignition step of making the flame in the combustion chamber in the compression stroke using the spark plug; and after the ignition step, a second fuel supply step of supplying the fuel into the combustion chamber in the compression stroke using the injector to increase a fuel concentration of the air-fuel mixture in the combustion chamber.

14 Claims, 12 Drawing Sheets

(51) Int. Cl.
  *F02D 41/00*  (2006.01)
  *F02D 41/38*  (2006.01)
  *F02P 5/15*  (2006.01)
  *F02P 21/00*  (2006.01)

(52) U.S. Cl.
  CPC ............... *F02D 41/38* (2013.01); *F02P 5/15* (2013.01); *F02P 21/00* (2013.01); *F02B 2075/027* (2013.01)

(56) References Cited

U.S. PATENT DOCUMENTS

| | | |
|---|---|---|
| 2015/0377206 A1 | 12/2015 | Idicheria et al. |
| 2016/0290273 A1 | 10/2016 | Ochi |

FOREIGN PATENT DOCUMENTS

| | | |
|---|---|---|
| FR | 2849898 A1 | 7/2004 |
| JP | 2001207854 A | 8/2001 |
| JP | 2011241756 A | 12/2011 |
| JP | 2012215098 A | 11/2012 |
| JP | 2012241590 A | 12/2012 |
| JP | 5447435 B2 | 3/2014 |
| JP | 2016089747 A | 5/2016 |
| JP | 2016196852 A | 11/2016 |
| JP | 6252647 B1 | 12/2017 |
| WO | 2015111392 A1 | 7/2015 |

* cited by examiner

ENGINE CONTROL METHOD AND ENGINE CONTROL DEVICE

TECHNICAL FIELD

The present disclosure relates to an engine control method and an engine control device.

BACKGROUND ART

Patent Document 1 discloses an engine that burns an air-fuel mixture in a fuel chamber by compression ignition in a high load range. In a high load and high speed range, this engine performs a small amount of fuel injection for ignition assistance at a post-stage of a compression stroke between preceding and succeeding injections for generating the air-fuel mixture for compression-ignition combustion. Accordingly, a rich air-fuel mixture is generated around a spark plug. Then, the spark plug ignites the rich air-fuel mixture to cause flame, whereby the air-fuel mixture generated by the preceding injection is compressed and ignited near compression top dead center. After that, the air-fuel mixture generated by the succeeding injection, which is performed at the same time as the compression ignition, is also compressed and ignited.

Patent Document 2 discloses an engine that performs a first fuel injection and spark ignition after the first fuel injection in a compression stroke in a low speed operation at an engine speed of about 2,000 rpm to perform spray-guided combustion. In a period before compression top dead center at a predetermined interval after the first fuel injection, the engine performs a second fuel injection to cause autoignition combustion of a portion of the mixture. The remaining mixture is subjected to diffusion combustion.

CITATION LIST

Patent Documents

Patent Document 1: Japanese Patent No. 5447435
Patent Document 2: Japanese Unexamined Patent Publication No. 2016-89747

SUMMARY OF THE INVENTION

Technical Problem

In an engine with a geometric compression ratio increased for the main purpose of improving thermal efficiency, an ignition unit performs spark ignition of an air-fuel mixture in a combustion chamber to cause combustion of the air-fuel mixture by flame propagation. Then, abnormal combustion including knocking may occur. For example, if the spark ignition is delayed to reduce the abnormal combustion, the combustion period becomes longer and the combustion center of gravity is largely away from compression top dead center. Accordingly, thermal efficiency of the engine decreases.

The present disclosure increases the thermal efficiency of an engine.

Solution to the Problem

The present inventors have focused on utilizing what is called a "broken reaction zone". In the broken reaction zone, a lean air-fuel mixture and/or a strong flow in the combustion chamber does not allow the progress of the combustion by flame propagation. Assume that the conditions inside of the combustion chamber fall within the broken reaction zone. When an air-fuel mixture is to be burned by the flame propagation, the made flame goes out. In the typical engine control, the air-fuel mixture is thus not spark-ignited, while the conditions inside the combustion chamber fall within the broken reaction zone.

However, the present inventors viewed the air-fuel mixture microscopically, newly finding the following. When an ignition unit ignites the air-fuel mixture in the broken reaction zone, a flame does not go out but is stored while being unable to cause the flame propagation. Once the conditions inside the combustion chamber fall out of the broken reaction zone, the stored flame starts to cause combustion of the air-fuel mixture at once. Based on the finding that the stored flame starts to cause combustion of the air-fuel mixture at once, once the conditions inside the combustion chamber fall out of the broken reaction zone, the present inventors completed the disclosed technique related to a new combustion mode.

Specifically, the present disclosure relates to an engine control method that executes a cycle including an intake stroke, a compression stroke, an expansion stroke, and an exhaust stroke in a combustion chamber. The method includes: a first fuel supply step of supplying fuel into the combustion chamber using a fuel supply unit when an ignition unit makes a flame in the combustion chamber so that an air-fuel mixture is generated at least around the ignition unit, the air-fuel mixture having an air-fuel mass ratio A/F or a gas-fuel mass ratio G/F, in which gas includes air, higher than a stoichiometric air-fuel ratio; after the first fuel supply step, an ignition step of making the flame in the combustion chamber in the compression stroke using the ignition unit; and after the ignition step, a second fuel supply step of supplying the fuel into the combustion chamber in the compression stroke using the fuel supply unit to increase a fuel concentration of the mixture in the combustion chamber.

According to the above configuration, in the first fuel supply step, the fuel is supplied into the combustion chamber to generate the air-fuel mixture in the combustion chamber. Generated at this time is the air-fuel mixture with the A/F or G/F higher than the stoichiometric air-fuel ratio at least around the ignition unit. A homogeneous lean air-fuel mixture may be generated throughout or almost throughout the inside of the combustion chamber. Alternatively, a lean mixture may be locally generated around the ignition unit. In addition, in the first fuel supply step, the fuel may be supplied into the combustion chamber before the ignition step which will be described later. For example, when the fuel is directly injected into the combustion chamber by the fuel supply unit, the fuel may be injected into the combustion chamber in a period from the intake stroke to an initial stage of the compression stroke. This allows for supply of the fuel into the combustion chamber before the ignition step. The "initial stage of the compression stroke" may be that initial stage where the compression stroke is evenly divided into three stages of an initial stage, a middle stage, and a final stage. On the other hand, for example, if the fuel supply unit is configured to inject the fuel into an intake port(s) connected to the combustion chamber (and into the combustion chamber), the fuel may be injected into the intake port(s) before the intake stroke (including the exhaust stroke). This allows for introduction of the fuel together with intake air into the combustion chamber in the period of the intake stroke and supply of the fuel into the combustion chamber before the ignition step.

In the compression stroke after the first fuel supply step, the ignition step is executed. In the ignition step, the ignition unit makes the flame in the combustion chamber. The ignition unit may be, for example, a spark plug that causes a spark discharge between electrodes. Further, the ignition unit may be configured to cause an arc discharge or a plasma discharge, for example. By applying energy to the air-fuel mixture, the ignition unit makes the flame in the combustion chamber. The mixture generated in the first fuel supply step is lean. Thus, even if flame is made in the ignition step, the flame is stored as it is without allowing the combustion by flame propagation. That is, the ignition step is performed when the conditions inside the combustion chamber fall within the broken reaction zone. The flame is dispersed or diffused into the combustion chamber by the flow in the combustion chamber.

Here, in the ignition step, the ignition unit may perform a plurality of discharges. This increases the number of flames made in the combustion chamber and allows for flow in the combustion chamber, thereby making it possible to diffuse the flames made into the combustion chamber.

After the ignition step, in the compression stroke, the second fuel supply step is executed. The fuel supply unit supplies the fuel into the combustion chamber, thereby increasing the fuel concentration of the air-fuel mixture. The fuel supply unit may be configured to inject the fuel directly into the combustion chamber. Note that the fuel supply unit that supplies the fuel in the first fuel supply step and the fuel supply unit that supplies the fuel in the second fuel supply step may be the same or different.

As the fuel concentration of the air-fuel mixture increases, the conditions inside the combustion chamber fall out of the broken reaction zone. Further, the temperature and the pressure in the combustion chamber increases at the final stage of the compression stroke due to motoring. The flame made in the ignition step and stored in the combustion chamber starts the combustion of the air-fuel mixture at the post-stage of the compression stroke or in the expansion stroke. More specifically, the combustion of the air-fuel mixture starts at once by autoignition near compression top dead center. The center of gravity of this combustion is close to compression top dead center, which improves the thermal efficiency of the engine. The adjustment of the timing of the additional fuel supply and/or the adjustment of the fuel amount to be additionally supplied make it possible to adjust the timing at which the combustion of the air-fuel mixture starts.

In addition, this combustion mode requires a shorter combustion period and thus reduces knocking. In the first fuel supply step, a lean air-fuel mixture is generated. The air-fuel mixture is thus generated at a relatively early stage, while reducing pre-ignition.

The ignition unit may make the flame during or before a post-mid stage, where the compression stroke is divided into four stages of a pre-stage, a pre-mid stage, the post-mid stage, and a post-stage.

In the period of the intake stroke, an intake flow is generated in the combustion chamber by introducing intake air through intake ports into the combustion chamber. The generated intake flow weakens once near intake bottom dead center. However, the flow inside the combustion chamber gradually strengthens in the period from the initial stage to the middle stage of the compression stroke when a piston moves toward top dead center, due to what is called a "spin-up phenomenon." After that, the flow inside the combustion chamber gradually weakens to the post-stage of the compression stroke. If the ignition unit makes the flame during or before the at post-mid stage, a strong flow occurs inside the combustion chamber. The flame can be thus made in the combustion chamber, when the conditions inside the combustion chamber fall within the broken reaction zone.

The ignition unit may make the flame at a middle stage, where the compression stroke is divided into three stages of an initial stage, the middle stage, and a final stage.

The flow in the combustion chamber is strongest at the middle stage in the compression stroke. If the ignition unit makes the flame too early or too late, the flame cannot be stored without causing any flame propagation. Therefore, the ignition unit may make the flame in the combustion chamber at the middle stage of the compression stroke.

The fuel supply unit may supply the fuel into the combustion chamber in the second fuel supply step so that the A/F or G/F of the air-fuel mixture in the combustion chamber is lower than or equal to the stoichiometric air-fuel ratio.

Accordingly, the conditions inside the combustion chamber fall out of the broken reaction zone, which allows the start of the combustion of the air-fuel mixture in the combustion chamber. If the A/F or G/F of the air-fuel mixture in the combustion chamber is equal or substantially equal to the stoichiometric air-fuel ratio, the exhaust gas can be purified using a three-way catalyst.

The engine may have a geometric compression ratio of 14 or more. The engine control method disclosed herein improves thermal efficiency, while reducing abnormal combustion in an engine with a high compression ratio.

The present disclosure also relates to an engine control device. This engine control device includes: a combustion chamber configured to execute a cycle including an intake stroke, a compression stroke, an expansion stroke, and an exhaust stroke; an ignition unit arranged in the combustion chamber; a fuel supply unit configured to supply fuel into the combustion chamber. The fuel supply unit is configured to supply the fuel into the combustion chamber when the ignition unit makes a flame in the combustion chamber so that an air-fuel mixture is generated at least around the ignition unit, the air-fuel mixture having an air-fuel mass ratio A/F or a gas-fuel mass ratio G/F, in which gas includes air, higher than a stoichiometric air-fuel ratio. The ignition unit makes the flame in the combustion chamber in the compression stroke at a predetermined timing of the compression stroke. The fuel supply unit supplies, after the ignition unit has made the flame, the fuel into the combustion chamber in the compression stroke to increase a fuel concentration of the air-fuel mixture in the combustion chamber.

The ignition unit may make the flame during or before a post-mid stage, where the compression stroke is divided into four stages of a pre-stage, a pre-mid stage, the post-mid stage, and a post-stage.

The ignition unit may make the flame at a middle stage, where the compression stroke is divided into three stages of an initial stage, the middle stage, and a final stage.

After the ignition unit has made the flame, the fuel supply unit may supply the fuel into the combustion chamber so that the A/F or G/F of the air-fuel mixture in the combustion chamber is lower than or equal to the stoichiometric air-fuel ratio.

The engine may have a geometric compression ratio of 14 or more.

Advantages of the Invention

The engine control method and device described above increase the thermal efficiency of an engine.

Figure 10:
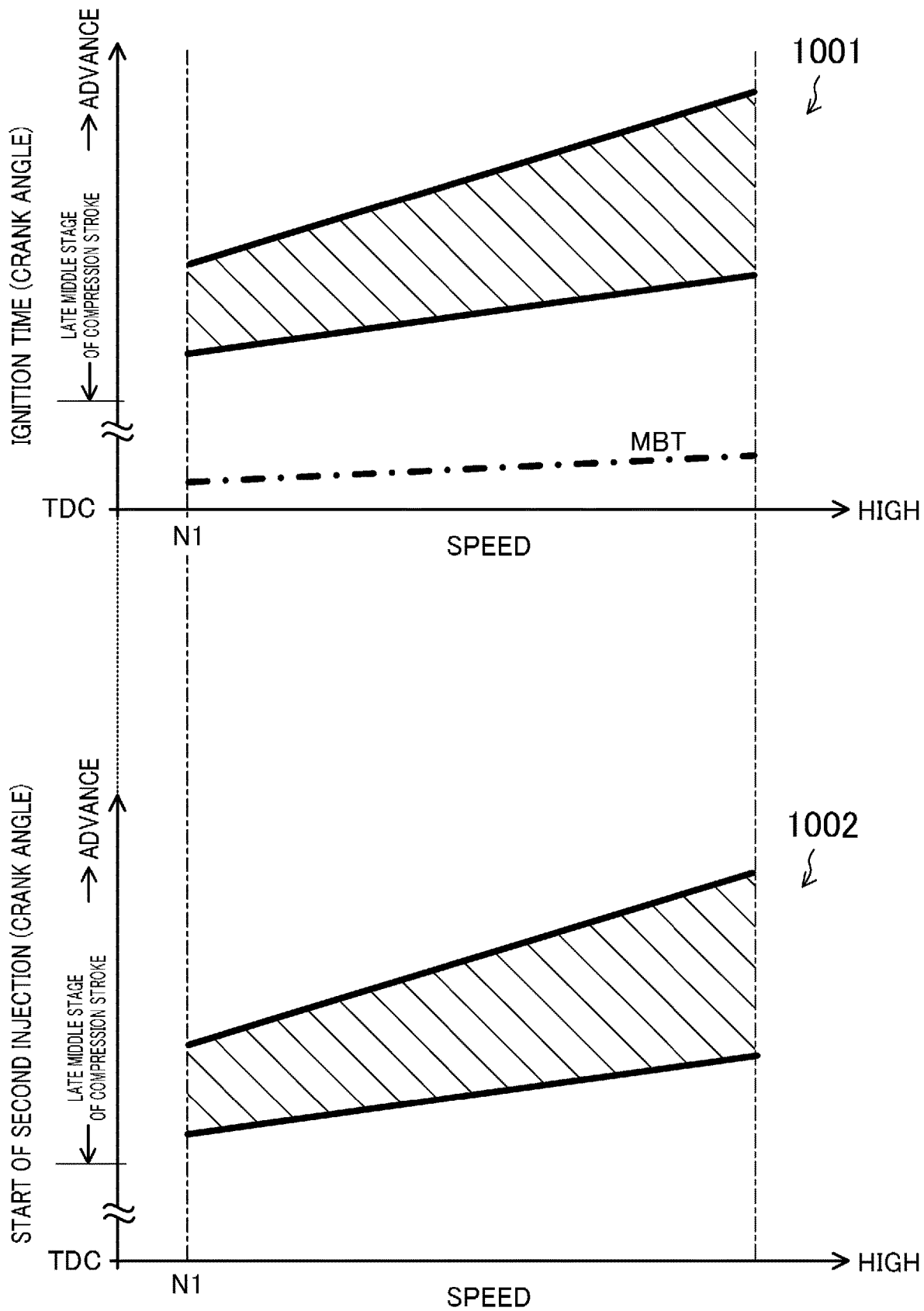

The upper illustration of FIG. 10 shows an example change in an ignition time with respect to an engine speed, whereas the lower illustration of FIG. 10 shows an example change in the start of second injection with respect to the engine speed.

Figure 11:
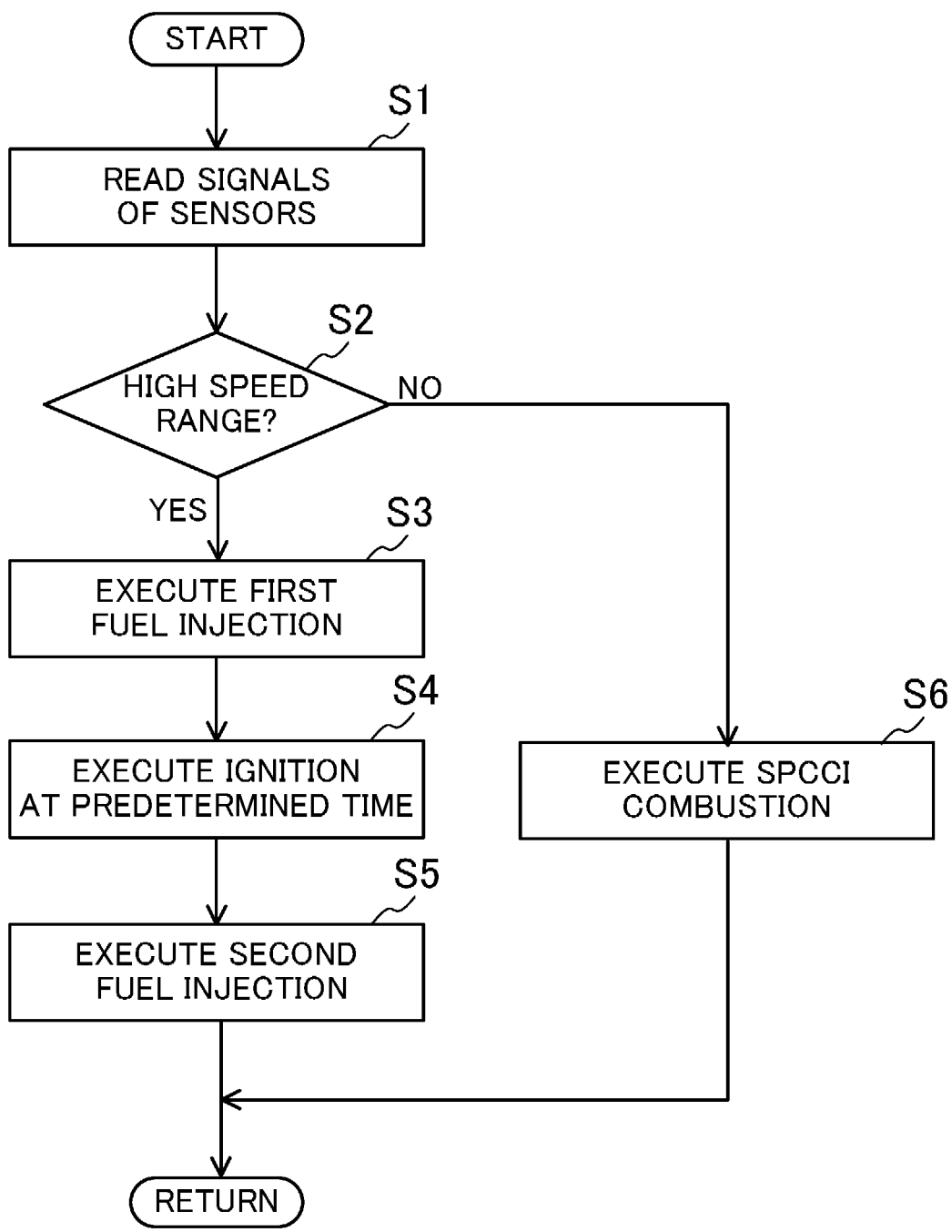

FIG. 11 is a flowchart related to the control of fuel injection and an ignition time.

Figure 1:
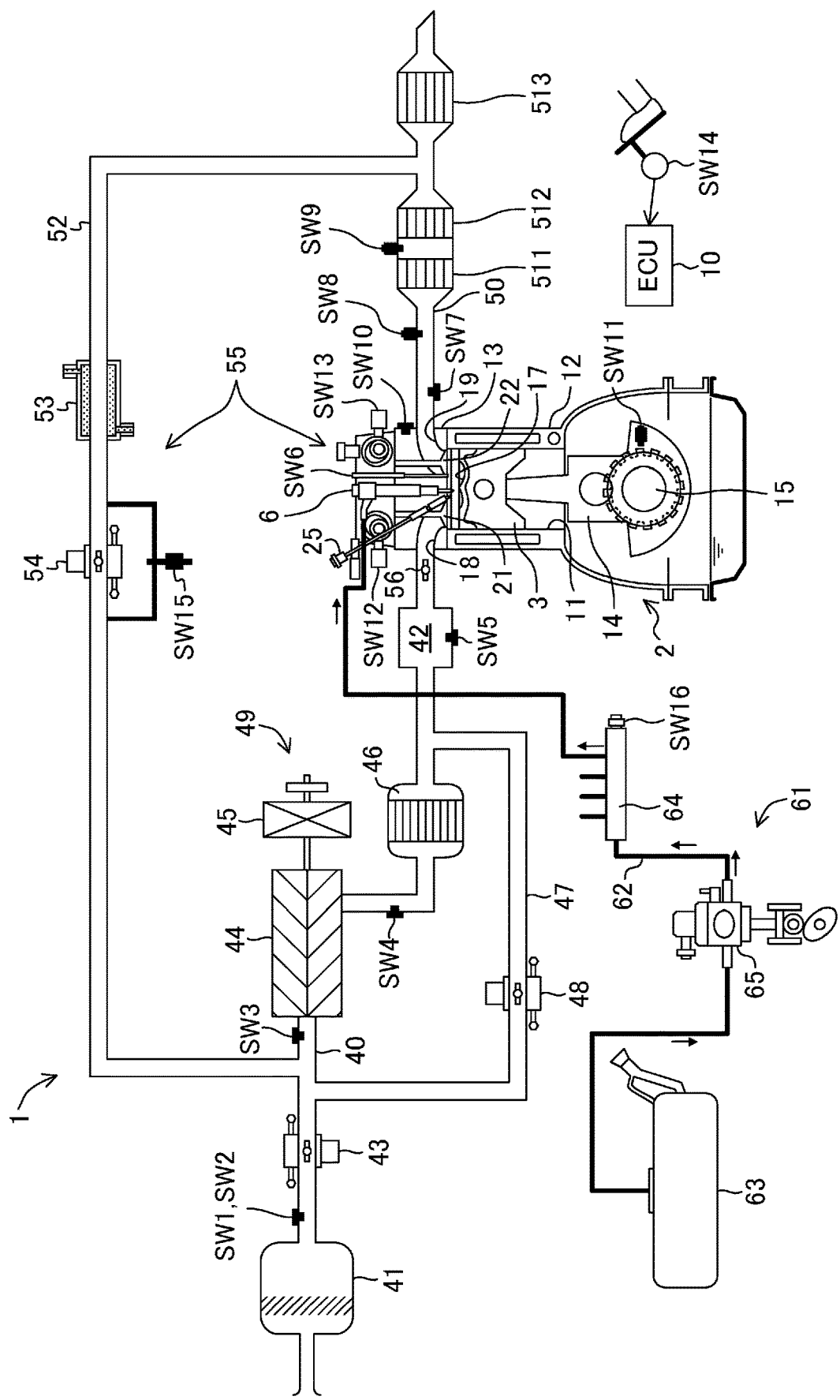
FIG. 1 illustrates a configuration of an engine system.
Figure 12:
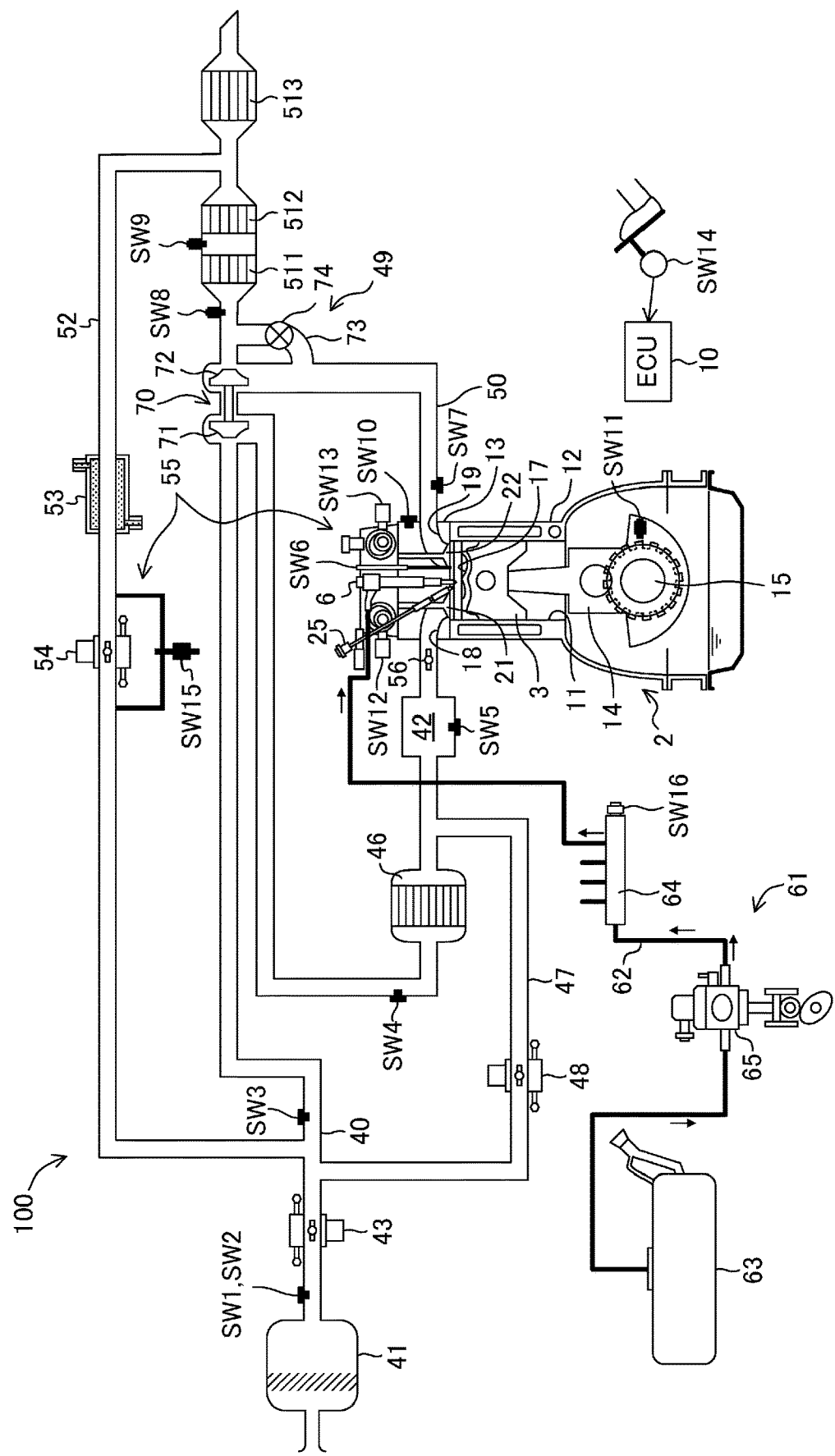

FIG. 12 illustrates a configuration of an engine system different from that in FIG. 1.

Figure 13:
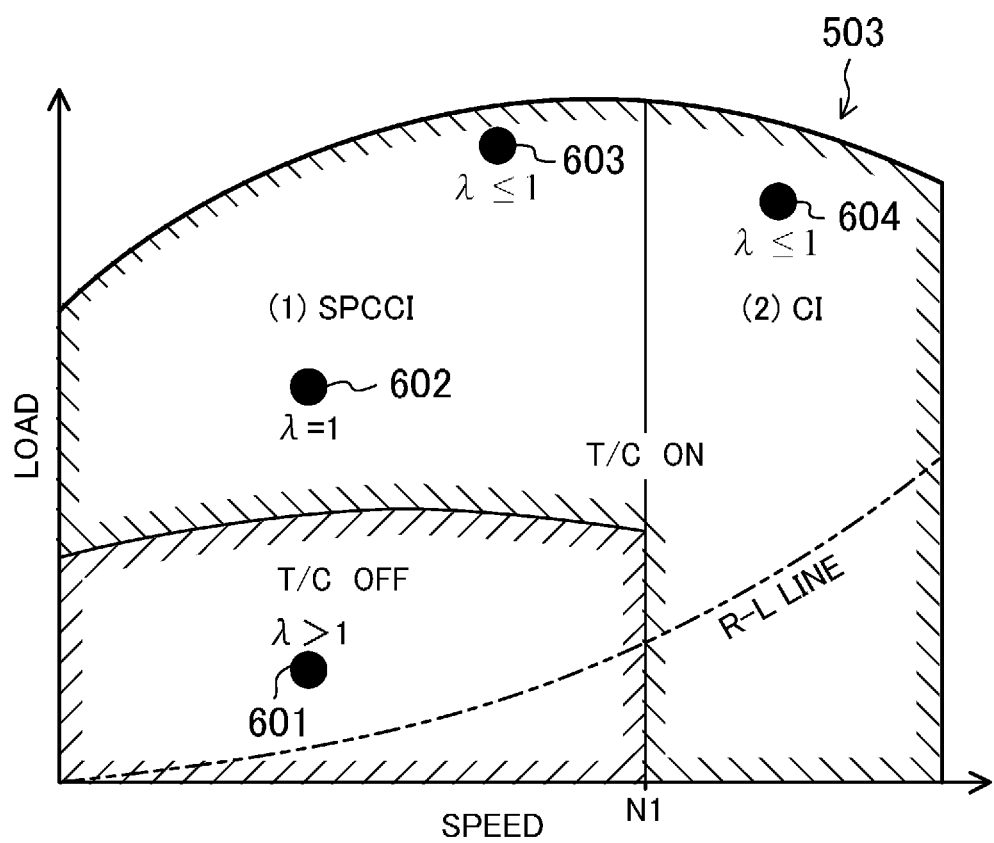

FIG. 13 illustrates an operating range map of the engine shown in FIG. 12.

DESCRIPTION OF EMBODIMENT

Figure 2:
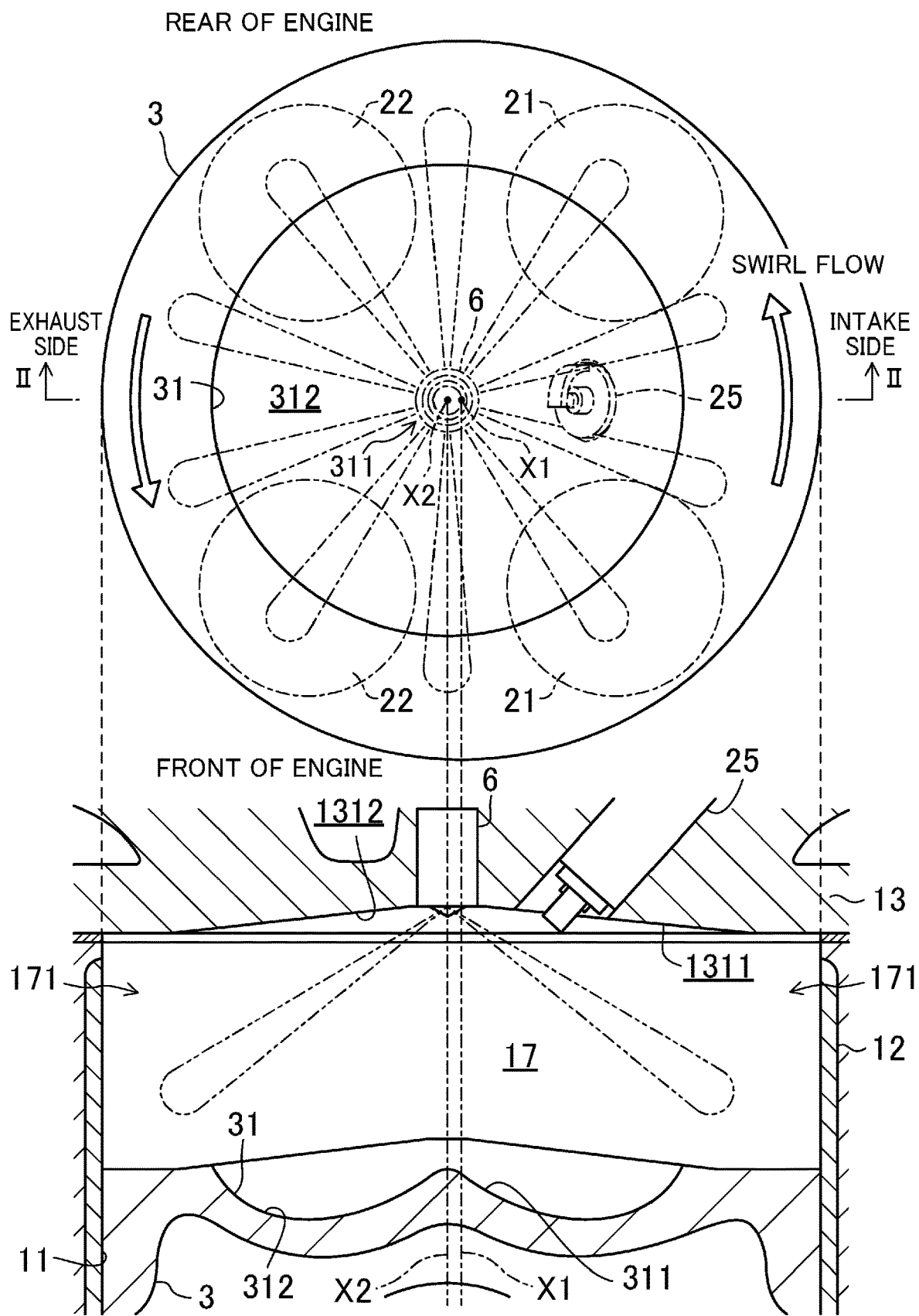
FIG. 2 illustrates a configuration of a combustion chamber.
Figure 3:
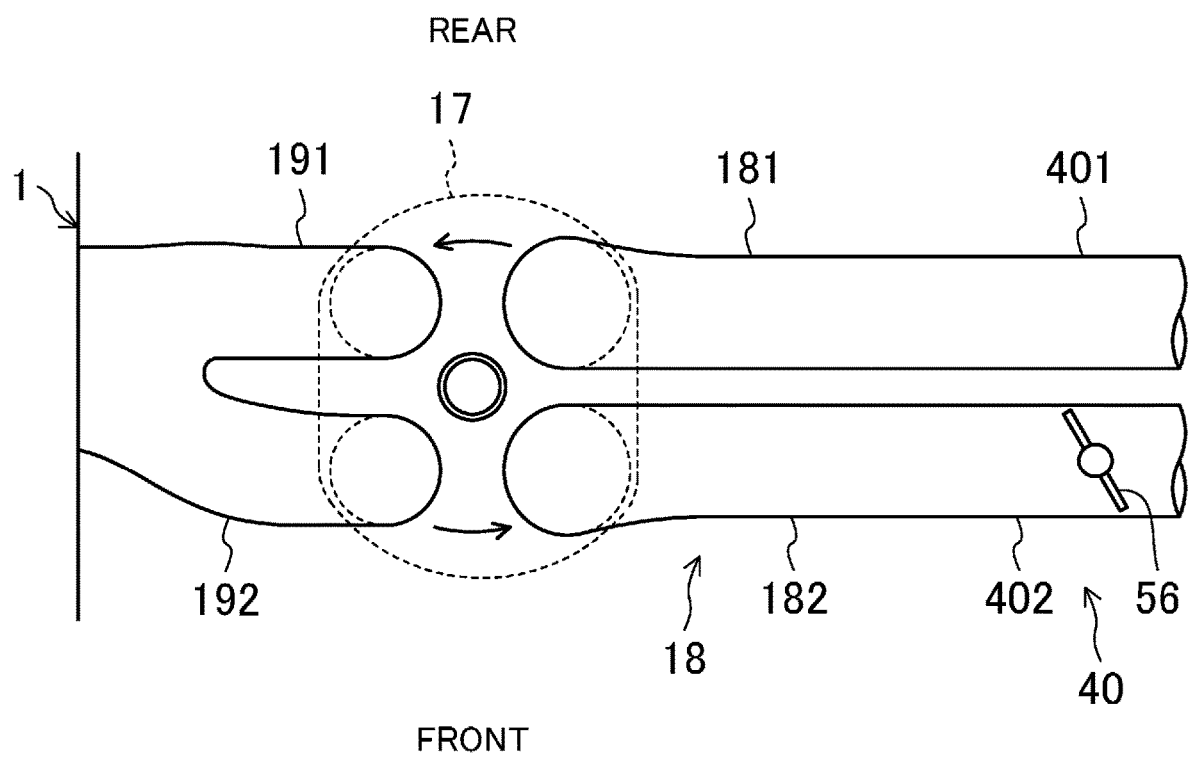
FIG. 3 is a top view illustrating configurations of the combustion chamber and an intake system.
Figure 4:
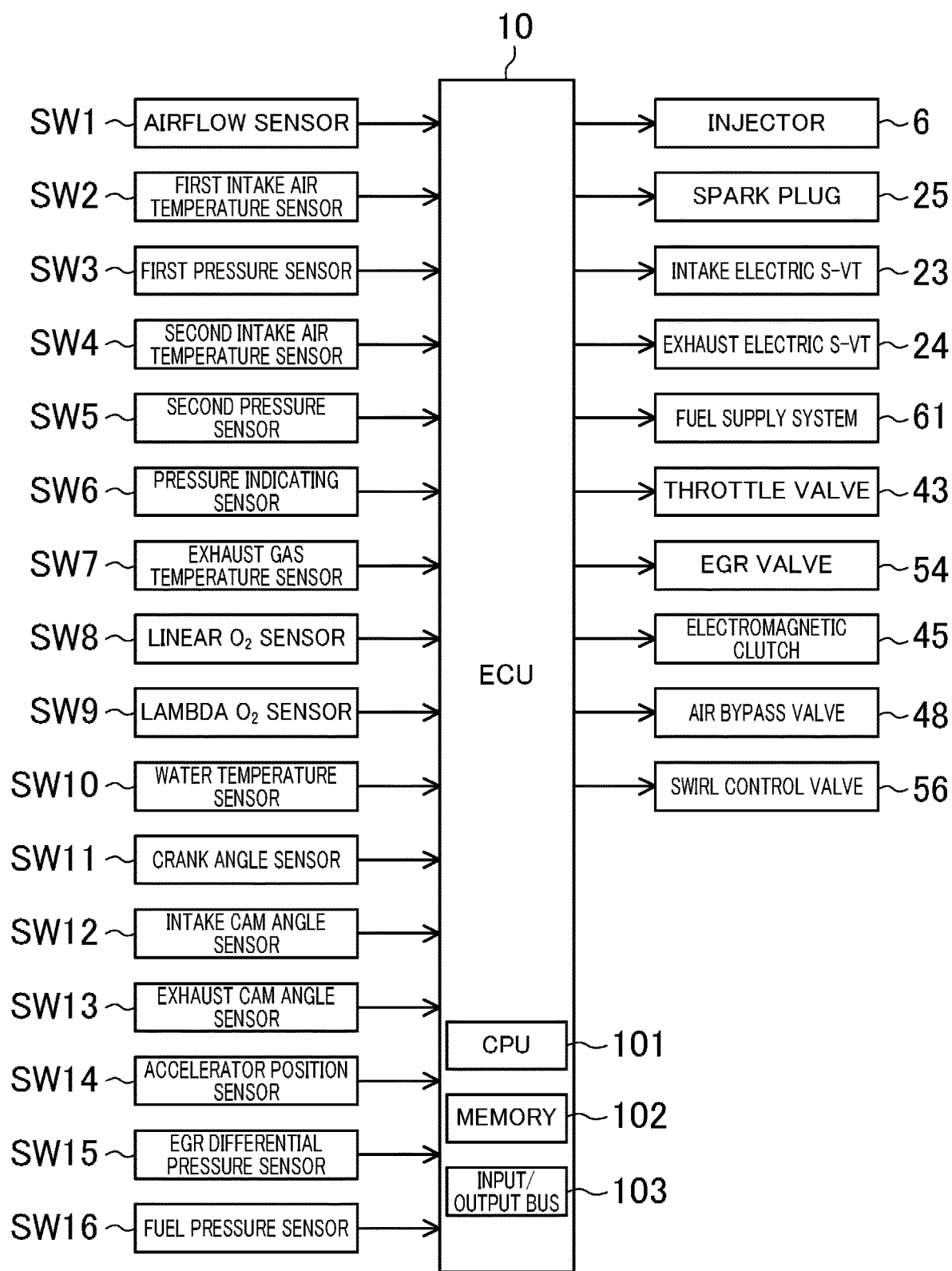
FIG. 4 is a block diagram illustrating a configuration of an engine control device.

An exemplary embodiment of an engine control device and an engine control method will now be described in detail with reference to the drawings. FIG. 1 illustrates a configuration of an engine system including an engine 1. FIG. 2 illustrates a configuration of a combustion chamber 17. In this FIG. 2, the upper illustration corresponds to a top view of the combustion chamber 17, whereas the lower illustration is a cross-sectional view taken along the line II-II of the upper illustration. FIG. 3 illustrates configurations of the combustion chamber 17 and an intake system. FIG. 4 is a block diagram illustrating a configuration of an engine control device. In FIG. 1, the intake side of the engine is located on the left of the drawing plane, whereas the exhaust side on the right of the drawing plane. In FIGS. 2 and 3, the intake side is located on the right of the drawing plane, whereas the exhaust side on the left of the drawing plane.

The engine 1 is a four-stroke engine that operates while repeating a cycle including an intake stroke, a compression stroke, an expansion stroke, and an exhaust stroke in the combustion chamber 17. The engine 1 is mounted in a four-wheeled motor vehicle. The motor vehicle travels in accordance with the operation of the engine 1. Fuel of the engine 1 is gasoline in this exemplary configuration. The fuel may be gasoline containing bioethanol, for example. The fuel for the engine 1 may be any fuel as long as the fuel is liquid fuel which contains at least gasoline.

<Configuration of Engine>

The engine 1 is a multi-cylinder engine. As shown in FIG. 1, the engine 1 includes an engine body 2 with the combustion chamber 17. The engine body 2 includes a cylinder block 12 and a cylinder head 13 above the cylinder block 12. Inside the cylinder block 12, a plurality of cylinders 11 are arranged. Note that FIGS. 1 and 2 each show only one of the cylinders 11.

A piston 3 is slidably fitted into each of the cylinders 11. The piston 3 is coupled to a crankshaft 15 via a connecting rod 14. The piston 3 defines the combustion chamber 17, together with each of the cylinders 11 and the cylinder head 13. Note that the "combustion chamber" meant here is not limited to the space defined when the piston 3 reaches a compression top dead center. The term "combustion chamber" may be used in a broader sense. That is, the "combustion chamber" may be the space defined by the piston 3, the cylinder 11, and the cylinder head 13, regardless of the position of the piston 3. The expression "in the combustion chamber" and "in the cylinder" may be used in substantially the same meaning.

As shown in the lower illustration of FIG. 2, the lower surface of the cylinder head 13, that is, the ceiling of the combustion chamber 17, includes inclined surfaces 1311 and 1312. The inclined surface 1311 is an upward slope extending from the intake side toward an injection axis X2 of an injector 6, which will be described later. On the other hand, the inclined surface 1312 is an upward slope extending from the exhaust side toward the injection axis X2. The ceiling of the combustion chamber 17 is in the shape of what is called a "pent roof".

The upper surface of the piston 3 protrudes toward the ceiling of the combustion chamber 17. Defined above the upper surface of the piston 3 is a cavity 31. The cavity 31 is recessed from the upper surface of the piston 3. The cavity 31 faces the injector 6 which will be described later. The center of the cavity 31 is shifted toward the exhaust side with respect to a center axis X1 of the cylinder 11 but agrees with the injection axis X2 of the injector 6.

The cavity 31 includes a projection 311. The projection 311 is located on the injection axis X2 of the injector 6. This projection 311 is in the shape of a substantial cone extending upward from the bottom of the cavity 31 toward the ceiling of the combustion chamber 17. The cavity 31 is symmetric about the injection axis X2 of the injector 6.

The cavity 31 also includes a recess 312 around the projection 311. The recess 312 surrounds the entire circumference of the projection 311. The circumferential side surface of the recess 312 is inclined with respect to the injection axis X2 from the bottom of the cavity 31 toward the opening of the cavity 31. The inner diameter of the cavity 31 of the recess 312 gradually increases from the bottom of the cavity 31 toward the opening of the cavity 31.

Note that the shape of the combustion chamber 17 is not limited to that illustrated in FIG. 2. That is, the shapes of the cavity 31, the upper surface of the piston 3, and the ceiling of the combustion chamber 17, for example, may be changed as appropriate. For example, the cavity 31 may be symmetric about the center axis X1 of the cylinder 11. The inclined surfaces 1311 and 1312 may be symmetric about the center axis X1 of the cylinder 11. The cavity 31 may have a shallow bottom that is shallower than the bottom of the recess 312 so as to face a spark plug 25, which will be described later.

The engine 1 has a geometric compression ratio ranging from 14 to 30. As will be described later, the engine 1 performs, in some operating ranges, SPark Controlled Compression Ignition (SPCCI) combustion that is a combination of spark ignition (SI) combustion and compression ignition (CI) combustion. The SI combustion is accompanied by flame propagation started by forcible ignition of an air-fuel mixture in the combustion chamber 17. The CI combustion is started by autoignition of the air-fuel mixture in the combustion chamber 17. The combined mode of these SI and CI combustions is as follows. The air-fuel mixture in the combustion chamber 17 is forcibly ignited to start the combustion by the flame propagation. Then, the heat generation and the flame propagation in the SI combustion increase the pressure, which leads to the compression ignition for burning unburned air-fuel mixture in the combustion chamber 17. In this engine 1, there is no need to significantly increase the temperature of the combustion chamber 17 when the piston 3 reaches compression top dead center, that is, the compression end temperature, for the autoignition of the air-fuel mixture.

The cylinder head 13 includes two intake ports 18 for each cylinder 11. As shown in FIG. 3, the intake ports 18 include two intake ports of first and second intake ports 181 and 182. The first and second intake ports 181 and 182 are aligned along the axis of the crankshaft 15, that is, in the front-rear direction of the engine body 2. The intake ports 18 communicate with the combustion chamber 17. Although not shown in detail, the intake ports 18 are what are called "tumble ports". That is, each intake port 18 is in a shape causing a tumble flow in the combustion chamber 17 in the intake stroke.

Each intake port 18 includes an intake valve 21. The intake valve 21 opens and closes the intake port 18 between the combustion chamber 17 and the intake port 18. The engine 1 includes a valve train mechanism for the intake valves 21. The intake valves 21 are opened and closed by a valve train mechanism at predetermined timing. The valve train mechanism for the intake valves 21 may be a variable valve train mechanism allowing variable valve timing and/or variable valve lift.

In this exemplary configuration, the variable valve train mechanism includes, as shown in FIG. 4, an intake electric sequential-valve timing (S-VT) 23. The intake electric S-VT 23 is a variable valve train mechanism of a phase type that causes the intake valves 21 to open at a constant angle and to open and close at variable times. The intake electric S-VT 23 continuously changes the rotational phase of an exhaust camshaft within a predetermined angular range. Accordingly, the opening and closing times of the intake valve 21 change continuously. Note that the valve train mechanism for the intake valves 21 may include a hydraulic S-VT instead of the electric S-VT. The valve train mechanism for the intake valves 21 may include a variable valve train mechanism that changes the amounts of lift of the intake valves 21 and/or a variable valve train mechanism that changes the opening angles (or the opening periods) of the intake valves 21.

The cylinder head 13 also includes two exhaust ports 19 for each cylinder 11. As shown in FIG. 3, the exhaust ports 19 include two exhaust ports, i.e., a first exhaust port 191 and a second exhaust port 192. The first and second exhaust ports 191 and 192 are aligned in the front-rear direction of the engine body 2. The exhaust ports 19 communicate with the combustion chamber 17.

Each exhaust port 19 includes an exhaust valve 22. The exhaust valve 22 opens and closes the exhaust port 19 between the combustion chamber 17 and the exhaust port 19. The engine 1 includes a valve train mechanism for the exhaust valves 22. The exhaust valves 22 are opened and closed by the valve train mechanism at predetermined timing. The valve train mechanism for the exhaust valves 22 may be a variable valve train mechanism allowing variable valve timing and/or variable valve lift.

In this exemplary configuration, the variable valve train mechanism includes, as shown in FIG. 4, an exhaust electric S-VT 24. The exhaust electric S-VT 24 is a variable valve train mechanism of a phase type that causes the exhaust valves 22 to open at a constant angle and to open and close at variable times. The exhaust electric S-VT 24 continuously changes the rotational phase of an exhaust camshaft within a predetermined angular range. Accordingly, the opening and closing times of the exhaust valves 22 change continuously. Note that the valve train mechanism for the exhaust valves 22 may include a hydraulic S-VT instead of the electric S-VT. The valve train mechanism for the exhaust valves 22 may include a variable valve train that changes the amounts of lift of the exhaust valves 22 and/or a variable valve train mechanism that changes the opening angles (or the opening periods) of the exhaust valves 22.

In the engine 1, the intake and exhaust electric S-VTs 23 and 24 adjust the length of the overlap period between the opening times of the intake valves 21 and the closing times of the exhaust valves 22. Accordingly, hot burned gas is confined in the combustion chamber 17. That is, internal exhaust gas recirculation (EGR) gas is introduced into the combustion chamber 17. The adjustment of the length of the overlap period allows scavenging of the residual gas (burned gas) in the combustion chamber 17.

The cylinder head 13 includes the injector 6 for each cylinder 11. The injector 6 directly injects the fuel into the combustion chamber 17. The injector 6 is an example a fuel supply unit. The injector 6 faces the inside of the combustion chamber 17 at the valley of the pent roof, at which the inclined surface 1311 on the intake side and the inclined surface 1312 on the exhaust side intersect each other, and is opposed to the cavity 31.

As shown in FIG. 2, the injection axis X2 of the injector 6 is parallel to the center axis X1 of the cylinder 11 and is closer to the exhaust side than the center axis X1 of the cylinder 11. The injection axis X2 of the injector 6 agrees with the position of the projection 311 of the cavity 31. Note that the injection axis X2 of the injector 6 may agree with the center axis X1 of the cylinder 11. In this case as well, it is desirable that the injection axis X2 of the injector 6 agree with the position of the projection 311 of the cavity 31.

Although not shown in detail, the injector 6 includes a multi-port combustion injection valve with a plurality of nozzle ports. As indicated by the two-dot chain lines in FIG. 2, the injector 6 injects the fuel so that the fuel spray spreads radially from the center of the combustion chamber 17 and spreads obliquely downward from the ceiling of the combustion chamber 17.

In this exemplary configuration, the injector 6 has ten nozzle ports. The nozzle ports are arranged at equal angles along the circumference of the injector 6. As shown in the upper illustration of FIG. 2, the axes of the nozzle ports are shifted along the circumference of the injector 6 with respect to the spark plug 25 which will be described later. That is, the spark plug 25 is interposed between the axes of two adjacent nozzle ports. This arrangement reduces the risk of direct contact of the spray of the fuel injected from the injector 6 with the spark plug 25, thereby making it possible to avoid making any electrode wet.

A fuel supply system 61 is connected to the injector 6. The fuel supply system 61 includes a fuel tank 63 configured to store the fuel, and a fuel supply passage 62 that connects the fuel tank 63 and the injector 6 together. The fuel supply passage 62 includes a fuel pump 65 and a common rail 64. The fuel pump 65 pumps out the fuel to the common rail 64.

In this exemplary configuration, the fuel pump 65 is a plunger pump driven by the crankshaft 15. The common rail 64 stores the fuel pumped out from the fuel pump 65 at a high fuel pressure. When the injector 6 opens, the fuel stored in the common rail 64 is injected from a nozzle port of the injector 6 into the combustion chamber 17.

The fuel supply system 61 can supply fuel to the injector 6 at a high pressure of 30 MPa or more. The maximum fuel pressure of the fuel supply system 61 may be about 120 MPa, for example. The pressure of the fuel to be supplied to the injector 6 may vary in accordance with the operating state of the engine 1. Note that the configuration of the fuel supply system 61 is not limited to the configuration described above.

The cylinder head 13 includes the spark plug 25 attached to each of the cylinders 11. The spark plug 25 performs a spark discharge between electrodes arranged in the combustion chamber 17, thereby forcibly igniting the air-fuel mixture in the combustion chamber 17. The spark plug 25 is an example of an ignition unit.

In this exemplary configuration, as shown in FIG. 2, the spark plug 25 is closer to the intake side with respect to the center axis X1 of the cylinder 11 in the combustion chamber 17. The spark plug 25 is adjacent to the injector 6 and interposed between the two intake ports. In addition, the spark plug 25 is attached to the cylinder head 13, while being inclined such that the bottom of the plug is closer to the center of the combustion chamber 17 than the top of the plug. The electrodes of the spark plug 25 face the combustion chamber 17 and are located near the ceiling of the combustion chamber 17.

One side surface of the engine body 2 is connected to an intake passage 40. The intake passage 40 communicates with the intake ports 18 of each cylinder 11 and with the combustion chamber 17 via the intake ports 18. Through the intake passage 40, the gas introduced into the combustion chamber 17 flows. Located at the upstream end of the intake passage 40 is an air cleaner 41 that filters fresh air. Located near the downstream end of the intake passage 40 is a surge tank 42. A part of the intake passage 40 downstream of the surge tank 42 forms independent passages that branch off for the respective cylinders 11. The downstream end of each independent passage is connected to the intake ports 18 of the associated one of the cylinders 11.

A throttle valve 43 is interposed between the air cleaner 41 and the surge tank 42 in the intake passage 40. The opening degree of the throttle valve 43 is adjusted to the amount of fresh air to be introduced into the combustion chamber 17.

In the intake passage 40, a supercharger 44 is provided downstream of the throttle valve 43. The supercharger 44 supercharges the gas inside the intake passage 40 to be introduced into the combustion chamber 17.

In the exemplary configuration, the supercharger 44 is a mechanical supercharger driven by the engine body 2. The mechanical supercharger 44 may be of a Roots type, for example. The mechanical supercharger 44 may have any configuration. The mechanical supercharger 44 may be of a Lysholm type, a vane type, or a centrifugal type.

An electromagnetic clutch 45 is interposed between the supercharger 44 and the engine body 2. The electromagnetic clutch 45 transmits a driving force from the engine body 2 to the supercharger 44 or blocks the driving force between the supercharger 44 and the engine body 2. As will be described later, the supercharger 44 is turned on and off by an engine control unit (ECU) 10 that determines whether to engage or disengage the electromagnetic clutch 45. Accordingly, the engine 1 determines whether or not to supercharge the gas to be introduced into the combustion chamber 17 by the supercharger 44.

In the intake passage 40, the intercooler 46 is provided downstream of the supercharger 44. The intercooler 46 cools the gas compressed by the supercharger 44. The intercooler 46 may be of a water-cooling type, for example. Alternatively, the intercooler 46 may be of an oil cooling type.

The intake passage 40 is also connected to a bypass passage 47. The bypass passage 47 connects the upstream part of the supercharger 44 and the downstream part of the intercooler 46 in the intake passage 40 together so as to bypass the supercharger 44 and the intercooler 46. The bypass passage 47 includes an air bypass valve 48. The air bypass valve 48 adjusts the flow rate of gas flowing through the bypass passage 47.

When the supercharger 44 is turned off, that is, when the electromagnetic clutch 45 is disengaged, the air bypass valve 48 fully opens. Accordingly, the gas flowing in the intake passage 40 bypasses the supercharger 44, that is, passes through none of the supercharger 44 or the intercooler 46 but through the bypass passage 47 and flows into the surge tank 42. The gas is then introduced into the combustion chamber 17 of the engine 1. The engine 1 operates without supercharging, that is, with natural aspiration.

When the supercharger 44 is turned on, that is, when the electromagnetic clutch 45 is engaged, the gas flowing through the intake passage 40 passes through the supercharger 44 and the intercooler 46 and then flows into the surge tank 42. At this time, if the air bypass valve 48 is open, a portion of the gas that has passed through the supercharger 44 flows back from the surge tank 42 through the bypass passage 47 to the upstream side of the supercharger 44. The backflow rate of such gas varies depending on the opening degree of the air bypass valve 48. The supercharging pressure of the gas inside the intake passage 40 may be controlled by adjusting the opening degree of the air bypass valve 48.

In this exemplary configuration, the supercharger 44, the bypass passage 47, and the air bypass valve 48 constitute a supercharging system 49 in the intake passage 40.

The engine 1 includes a swirl generating unit that generates a swirl flow in the combustion chamber 17. As shown in FIG. 3, the swirl generating unit is a swirl control valve 56 attached to the intake passage 40. The swirl control valve 56 is located in a secondary passage 402 out of primary and secondary passages 401 and 402 that communicate with the first and second intake ports 181 and 182, respectively.

The swirl control valve 56 is an opening degree adjustment valve capable of narrowing the cross-section of the secondary passage 402. In the combustion chamber 17, a swirl flow occurs which has a strength corresponding to the opening degree of the swirl control valve 56. The swirl flow circulates counterclockwise in FIG. 3 as indicated by the arrows (see the white arrows in FIG. 2 as well).

At a lower opening degree of the swirl control valve 56, the flow rate of the intake air flowing from the first intake port 181 into the combustion chamber 17 relatively increases, whereas the flow rate of the intake air flowing from the second intake port 182 into the combustion chamber 17 relatively decreases, out of the first and second intake ports 181 and 182 aligned in the front-rear direction of the engine body 2. This causes a stronger swirl flow in the combustion chamber 17. When the swirl control valve 56 opens at a higher degree, the flow rates of the intake air flowing into the combustion chamber 17 from the first and second intake ports 181 and 182 are substantially equal to each other. This causes a weaker swirl flow in the combustion chamber 17. When the swirl control valve 56 fully opens, the swirl flow does not occur.

Instead of or in addition to attaching the swirl control valve 56 to the intake passage 40, the swirl generating section may employ the following configuration. The opening periods of two intake valves 21 to allow introduction of the intake air from only one of the intake valves 21 into the combustion chamber 17. With the opening of only one of the two intake valves 21, the intake air is unevenly introduced into the combustion chamber 17, which allows generation of a swirl flow in the combustion chamber 17. In addition, each intake port 18 may have an innovative shape so that the swirl generating unit generates a swirl flow in the combustion chamber 17.

The other side surface of the engine body 2 is connected to an exhaust passage 50. The exhaust passage 50 communicates with the exhaust ports 19 of each cylinder 11 and with the combustion chamber 17 via the exhaust ports 19. Through the exhaust passage 50, exhaust gas discharged from the combustion chamber 17 flows. Although not shown in detail, an upstream part of the exhaust passage 50 forms independent passages that branch off for the respective cylinders 11. The upstream end of each independent passage is connected to the exhaust ports 19 of associated one of the cylinders 11.

The exhaust passage 50 is provided with an exhaust gas purification systems having a plurality of (two in the example shown in FIG. 1) catalyst converters. Although not shown, an upstream catalyst converter is located inside an engine compartment. This upstream catalyst converter includes a three-way catalyst 511 and a gasoline particulate filter (GPF) 512. On the other hand, a downstream catalyst converter is located outside the engine compartment. This downstream catalyst converter includes a three-way catalyst 513.

Note that the configuration of the exhaust gas purification system is not limited to the exemplary configuration shown in the figure. For example, the GPF 512 may be omitted. The catalyst converters are not limited to the three-way catalysts 511 and 513. The order of the three-way catalysts 511 and 513 and the GPF 512 may be changed as appropriate.

An EGR passage 52 constituting an external EGR system is interposed between the intake passage 40 and the exhaust passage 50. The EGR passage 52 is for returning a portion of the burned gas into the intake passage 40 and connects the intake passage 40 and the exhaust passage 50 together. The upstream end of the EGR passage 52 is connected between the upstream and downstream catalyst converters in the exhaust passage 50. On the other hand, a downstream end of the EGR passage 52 is connected to the upstream side of the supercharger 44 in the intake passage 40. The external EGR system is what is called a "low-pressure EGR system".

The EGR passage 52 includes a water-cooling EGR cooler 53. The EGR cooler 53 cools the burned gas. The EGR passage 52 also includes an EGR valve 54. The EGR valve 54 adjusts the flow rate of the burned gas flowing through the EGR passage 52. The backflow rate of the cooled burned gas, that is, external EGR gas, may be adjusted by changing the opening degree of the EGR valve 54.

In this exemplary configuration, an EGR system 55 includes the external EGR system including the EGR passage 52 and the EGR valve 54, and the internal EGR system including the intake and exhaust electric S-VTs 23 and 24 described above.

The engine system includes the ECU 10 for operating the engine 1. The ECU 10 is a controller including a known microcomputer as a base element. As shown in FIG. 4, the ECU 10 includes a central processing unit (CPU) 101, memory 102 such as random-access memory (RAM) and read-only memory (ROM), and an input and output (I/O) bus 103. The CPU 101 executes programs. The memory 102 stores the programs and data. The I/O bus 103 receives and outputs electrical signals.

This ECU 10 is connected to the injectors 6 described above, the spark plugs 25, the intake electric S-VT 23, the exhaust electric S-VT 24, the fuel supply system 61, the throttle valve 43, the EGR valve 54, the electromagnetic clutch 45 of the supercharger 44, the air bypass valve 48, and the swirl control valve 56. As shown in FIGS. 1 and 4, the ECU 10 is also connected to various types of sensors SW1 to SW16. The sensors SW1 to SW16 output detection signals to the ECU 10.

The sensors includes the following. An airflow sensor SW1 and a first intake air temperature sensor SW2 are arranged downstream of the air cleaner 41 in the intake passage 40. A first pressure sensor SW3 is located downstream of the part of the intake passage 40 connected to the EGR passage 52 and upstream of the supercharger 44. A second intake air temperature sensor SW4 is located downstream of the supercharger 44 in the intake passage 40 and upstream of the part of the intake passage 40 connected to the bypass passage 47. A second pressure sensor SW5 is attached to the surge tank 42. A pressure indicating sensor SW6 is attached to the cylinder head 13 in association with each cylinder 11. An exhaust gas temperature sensor SW7 is located in the exhaust passage 50.

The airflow sensor SW1 detects the flow rate of the fresh air flowing through the intake passage 40. The first intake air temperature sensor SW2 detects the temperature of the fresh air flowing through the intake passage 40. The first pressure sensor SW3 detects the pressure of the gas flowing into the supercharger 44. The second intake air temperature sensor SW4 detects the temperature of the gas flowing out from the supercharger 44. The second pressure sensor SW5 detects the pressure of the gas downstream of the supercharger 44. The indicator sensor SW6 detects the pressures inside the combustion chamber 17. The exhaust gas temperature sensor SW7 detects the temperature of the exhaust gas discharged from the combustion chamber 17.

The sensors further include the following. A linear $O_2$ sensor SW8 is disposed upstream of the upstream catalyst converter in the exhaust passage 50. A lambda $O_2$ sensor SW9 is disposed downstream of the three-way catalyst 511 in the upstream converter. A water temperature sensor SW10, a crank angle sensor SW11, an intake cam angle sensor SW12, and an exhaust cam angle sensor SW13 are attached to the engine body 2. An accelerator position sensor SW14 is attached to an accelerator pedal mechanism. An EGR differential pressure sensor SW15 is disposed in the EGR passage 52. A fuel pressure sensor SW16 is attached to the common rail 64 of the fuel supply system 61.

The linear $O_2$ sensor SW8 and the lambda $O_2$ sensor SW9 each detect the oxygen concentration in the exhaust gas. The water temperature sensor SW10 detects the temperature of the coolant. The crank angle sensor SW11 detects the rotation angle of the crankshaft 15. The intake cam angle sensor SW12 detects the rotation angle of the intake camshaft. The exhaust cam angle sensor SW13 detects the rotation angle of the exhaust camshaft. The accelerator position sensor SW14 detects the accelerator position. The EGR differential pressure sensor SW15 detects the differential pressure between the upstream and downstream sides of the EGR valve 54. The fuel pressure sensor SW16 detects the pressure of the fuel to be supplied to the injectors 6.

Based on the detection signals of these sensors, the ECU 10 determines the operating state of the engine 1 and calculates the control amounts of the devices. The ECU 10 outputs control signals related to the calculated control amounts to the injectors 6, the spark plugs 25, the intake electric S-VT 23, the exhaust electric S-VT 24, the fuel supply system 61, the throttle valve 43, the EGR valve 54, the electromagnetic clutch 45 of the supercharger 44, the air bypass valve 48, and the swirl control valve 56.

For example, the ECU 10 sets the target torque of the engine 1 and determines the target supercharging pressure based on the detection signal of the accelerator position sensor SW12 and a map set in advance. Then, the ECU 10 adjusts the opening degree of the air bypass valve 48 based on the target supercharging pressure and the differential pressure before and after the supercharger 44 obtained from the detection signals of the first pressure sensor SW3 and the second pressure sensor SWS. Accordingly, feedback control is performed so that the supercharging pressure reaches the target supercharging pressure.

The ECU 10 sets the target EGR rate, that is, the ratio of the EGR gas to the entire gas in the combustion chamber 17, based on the operating state of the engine 1 and the map set in advance. Then, the ECU 10 determines the target amount of EGR gas based on the target EGR rate and the amount of the intake air based on the detection signal of the accelerator position sensor SW12. The ECU 10 adjusts the opening degree of the EGR valve 54 based on the differential pressure before and after the EGR valve 54 obtained from the detection signal of the EGR differential pressure sensor SW15. Through the determination and the adjustment, the ECU 10 performs feedback control so that the amount of the external EGR gas to be introduced into the combustion chamber 17 reaches the target amount of EGR gas.

The ECU 10 further executes feedback control of the air-fuel ratio upon satisfaction of predetermined control conditions. Specifically, the ECU 10 adjusts the amount of fuel injection by the injectors 6 based on the oxygen concentration in the exhaust gas detected by the linear $O_2$ sensor SW8 and the lambda $O_2$ sensor SW9 so that the air-fuel ratio of the air-fuel mixture reaches a desired value.

Details of the control of the engine 1 by the ECU 10 will be described later.

<Operating Range Map of Engine>

Figure 5:
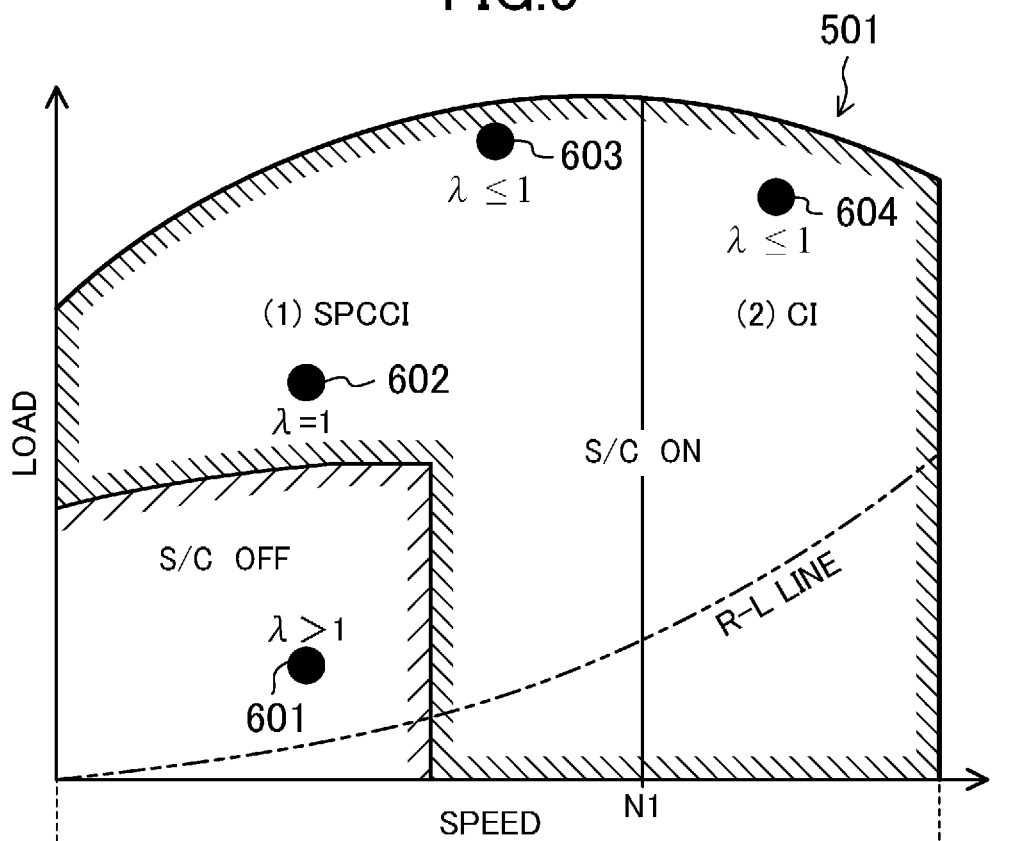
FIG. 5 illustrates operating range maps of the engine shown in FIG. 1.
Figure 5:
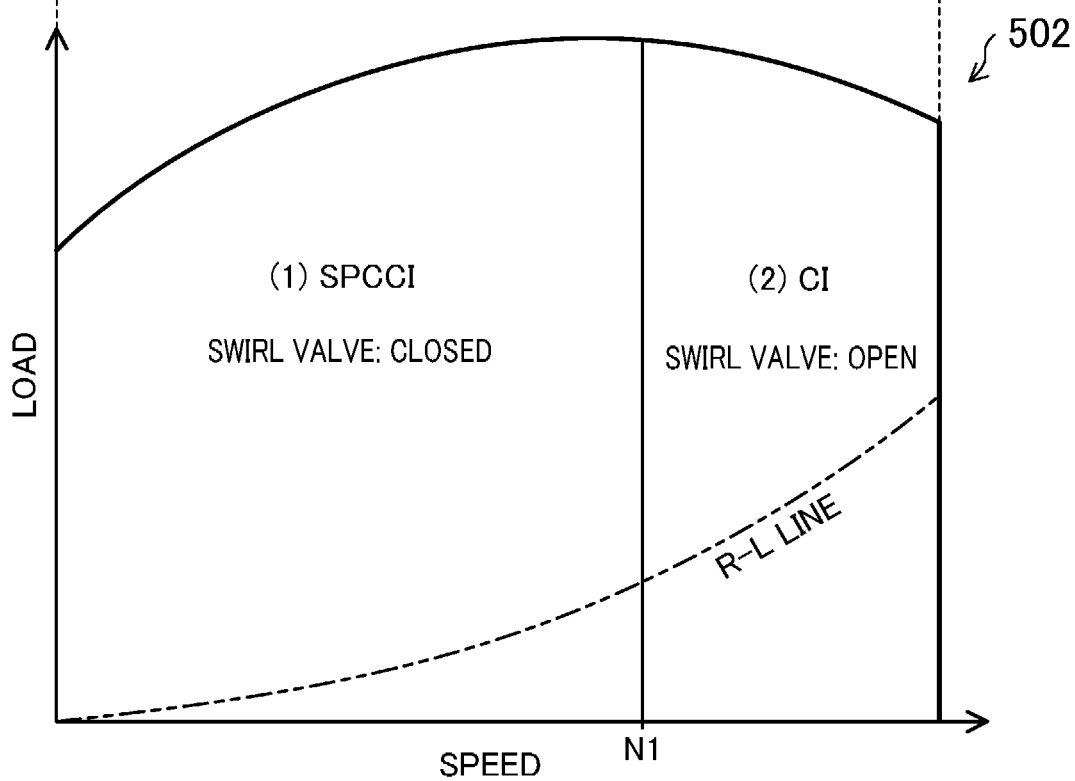

FIG. 5 illustrates operating range maps 501 and 502 of the warmed-up engine 1. The operating range maps 501 and 502 of the engine 1 are defined by the load and speed of the engine 1, and are divided into two ranges based on the magnitude of the speed of the engine 1.

Specifically, the two ranges are: an SPCCI range (1) at a lower speed, specifically, at an engine speed lower than N1; and a CI range (2) at a higher speed, specifically, at an engine speed higher than or equal to N1. The SPCCI range (1) may here include low and medium speeds, if the entire operating range of the engine 1 is divided into three of low, medium, and high speed ranges in the direction of the speed. On the other hand, the CI range (2) may include the high speed range. The speed N1 may be about 4,000 rpm, for example.

In FIG. 5, for easier understanding, each of the operating range maps 501 and 502 of the engine 1 is divided into two ranges. The map 501 shows the conditions of the air-fuel mixture and the combustion modes in operating states 601 to 604 of the engine 1 and driving and non-driving ranges of the supercharger 44. The map 502 shows the opening degree of the swirl control valve 56 in each range. Note that the two-dot chain lines in FIG. 5 represent road-load lines of the engine 1.

Figure 6:
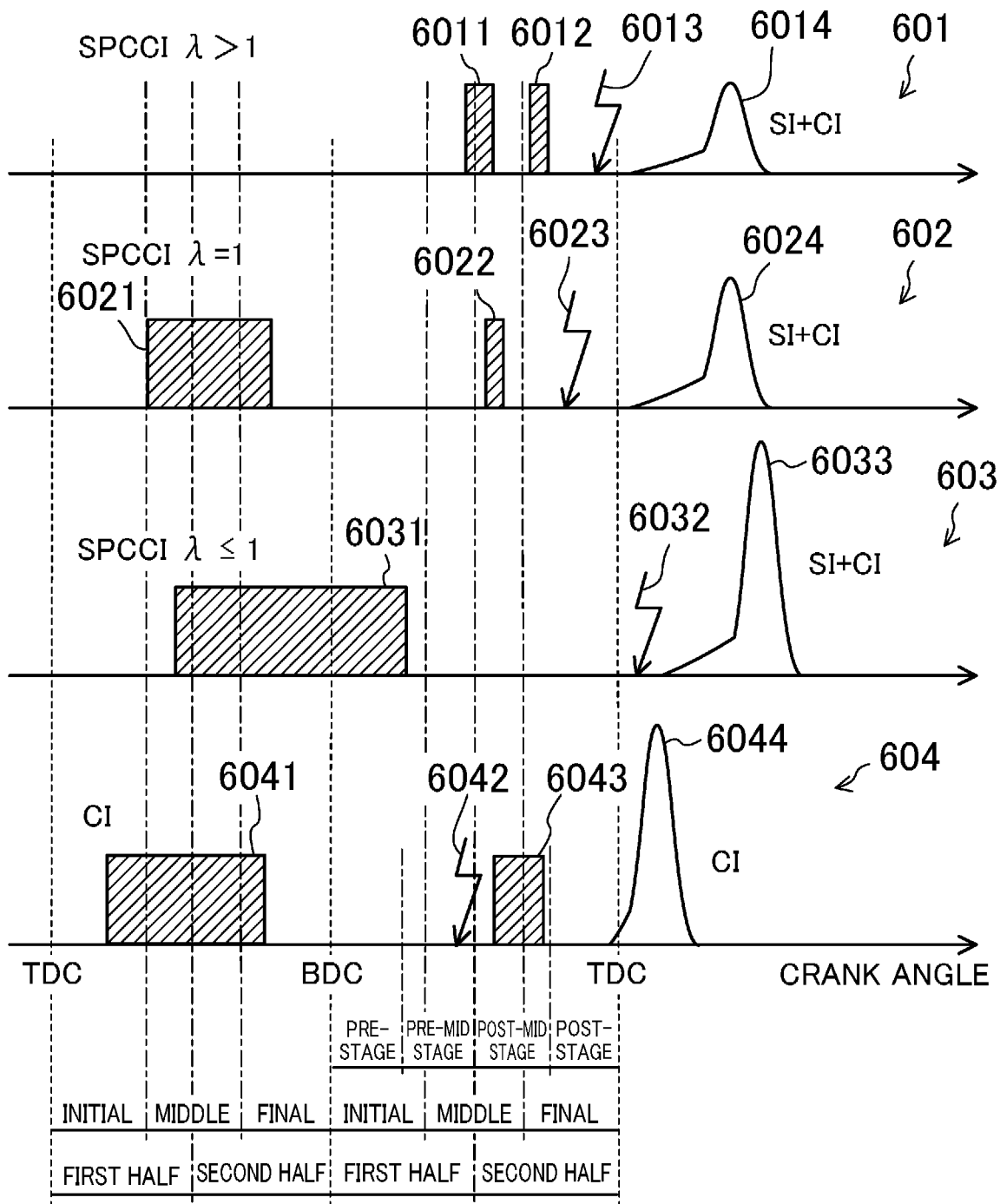
FIG. 6 illustrates fuel injection times, ignition times, and combustion waveforms in respective operating states.

The engine 1 performs combustion by compressed autoignition for the main purpose of improving fuel efficiency and the exhaust gas performance. More specifically, the engine 1 performs the SPCCI combustion described above in the SPCCI range (1). In the CI range (2), the engine 1 performs the CI combustion. Now, the operation of the engine 1 in the operating states 601 to 604 shown in FIG. 5 will be described in detail with reference to the fuel injection and ignition times shown in FIG. 6. In FIG. 6, the horizontal axis indicates the crank angle which advances from the left to the right in the drawing plane of FIG. 6.

<Engine Control in Low-Load Operation in SPCCI Range (1)>

While operating in the SPCCI range (1), the engine 1 performs the SPCCI combustion as described above. In the combustion by the autoignition, the autoignition timing largely changes with a variation in the temperature in each combustion chamber 17 before the start of the compression. In the SPCCI combustion, the spark plug 25 forcibly ignites the air-fuel mixture in the combustion chamber 17 to cause the SI combustion of the air-fuel mixture by the flame propagation. The heat generated in the SI combustion increases the temperature in the combustion chamber 17. The increase in the temperature in the combustion chamber 17 by the flame propagation causes the CI combustion of the unburned mixture by the autoignition. By adjusting the amount of heat generated by the SI combustion, the variation in the temperature is compensated in the combustion chamber 17 before the start of the compression. That is, even if the temperature in the combustion chamber 17 varies before the start of the compression, the autoignition timing can be controlled by adjusting the start of the SI combustion through the adjustment of the ignition timing, for example.

In FIG. 6, the reference character 601 denotes an example including fuel injection times (reference characters 6011 and 6012), an ignition time (reference character 6013), and a combustion waveform (reference character 6014) in a low load operating mode 601 of the engine 1 in the SPCCI range (1). The combustion waveform represents a change in the heat generation rate with respect to the crank angle.

In the SPCCI combustion, the spark plug 25 ignites the air-fuel mixture at a predetermined timing near compression top dead center (TDC on the right of FIG. 6). Accordingly, the combustion by the flame propagation starts. The heat generation is more moderate in the SI combustion than in the CI combustion. The waveform of the heat generation rate has thus a relatively shallow slope at the rising. Although not shown, the pressure fluctuation (dp/dθ) in the combustion chamber 17 is also more moderate in the SI combustion than in the CI combustion.

Once the SI combustion increases the temperature and the pressure inside the combustion chamber 17, the autoignition of the unburned air-fuel mixture occurs. In the example of FIG. 6, at the autoignition timing, the waveform of the heat generation rate changes from the shallower slope to a steeper slope (see the reference character 6014). That is, the waveform of the heat generation rate has an inflection point at the start of the CI combustion.

After the start of the CI combustion, the SI and CI combustions are performed in parallel. Since the CI combustion generates more heat than the SI combustion, and thus, has a relatively high heat generation rate. However, since the CI combustion is performed after compression top dead center, the piston 3 is lowered by the motoring, which does not allow the CI combustion to cause an excessively steep slope of the waveform of the heat generation rate. In addition, the pressure fluctuation (dp/dθ) in the CI combustion becomes relatively moderate.

The pressure fluctuation (dp/dθ) may be used as an index representing combustion noise. The SPCCI combustion can reduce the pressure fluctuation (dp/dθ) as described above, thereby making it possible to avoid causing too much combustion noise. This allows for suppression of combustion noise to an acceptable level or lower.

The SPCCI combustion ends with an end of the CI combustion. The CI combustion requires a shorter combustion period than the SI combustion. Thus, the combustion ends earlier in the SPCCI combustion than in the SI combustion. In other words, in the SPCCI combustion, the combustion end can be closer to compression top dead center in the expansion stroke. Therefore, the SPCCI combustion is more advantageous in improving the fuel efficiency of the engine 1 than the SI combustion.

The EGR system 55 introduces the EGR gas into the combustion chamber 17 at a low load of the engine 1 in the SPCCI range (1) to improve the fuel efficiency of the engine 1.

Specifically, a positive overlap period, in which both the intake and exhaust valves 21 and 22 are open, is provided near the exhaust top dead center. This leads to performing the internal EGR in which a part of the exhaust gas discharged from the inside of the combustion chamber 17 to the intake and exhaust ports 18 and 19 returns and is reintroduced into the combustion chamber 17. The internal EGR introduces hot burned gas (i.e., internal EGR gas) into the combustion chamber 17 and thus increases the temperature in the combustion chamber 17, which is advantageous in stabilizing the SPCCI combustion.

At a low load of the engine 1, the EGR valve 54 is fully closed. The external EGR gas is not introduced into the combustion chamber 17.

The supercharger 44 is turned off at a low load of the engine 1 in the SPCCI range (1). Specifically, the supercharger 44 is turned off (see S/C OFF) at a lower speed and at low and medium loads in the SPCCI range (1). Even at the low and medium loads of the engine 1, the supercharger 44 is turned on (see S/C ON) at a higher speed of the engine 1 and increases the supercharging pressure to ensure a required filling amount of the intake air.

When the supercharger 44 is turned off not to supercharge the gas in the intake passage 40, the pressure inside the intake passage 40 is relatively low. The internal EGR gas is thus introduced into the combustion chamber 17 in the positive overlap period as described above.

When the supercharger 44 is turned on to supercharge the gas in the intake passage 40, the pressure inside the intake passage 40 is relatively high. The gas in the intake passage 40 thus passes through the combustion chamber 17 of the engine body 2 and blows to the exhaust passage 50 in the positive overlap period. Accordingly, the burned gas remaining in the combustion chamber 17 is pushed out to the exhaust passage 50 and scavenged.

In an operation of the engine 1 in the SPCCI range (1), the swirl control valve 56 is fully closed or at a predetermined closing angle. Accordingly, a relatively strong swirl flow occurs in the combustion chamber 17. The swirl flow is stronger on the periphery of the combustion chamber 17 and weaker at the center. As described above, each intake port 18 is the tumble port. Thus, an oblique swirl flow with a tumble component and a swirl component occurs in the combustion chamber 17.

At a low load of the engine 1, the swirl ratio is 4 or more, for example. The swirl ratio is here defined as follows. The "swirl ratio" is the value obtained through dividing, by the angular velocity of the engine, the value obtained through measuring and integrating the lateral angular velocities of the intake flows for the respective valve lifts. The lateral angular velocity of the intake flow may be obtained based on measurement using a rig tester shown in FIG. 7.

Figure 7:
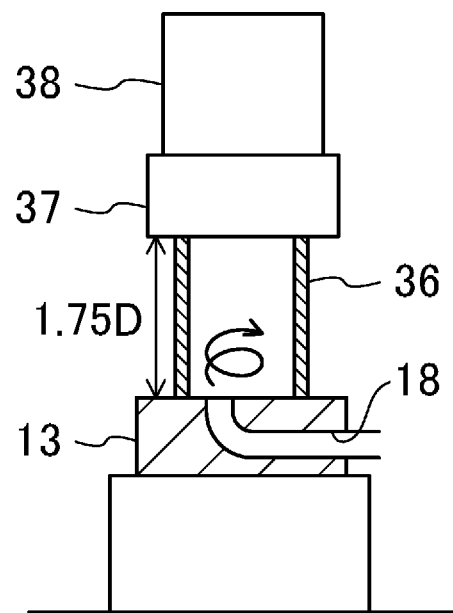
FIG. 7 illustrates a rig tester for swirl ratio measurement.

The tester shown in FIG. 7 is configured as follows. The cylinder head 13 is placed upside down on a base to connect the intake ports 18 to an intake air supplier (not shown). Meanwhile, a cylinder 36 is placed on the cylinder head 13 to connect an impulse meter 38 including a honeycomb rotor 37 at the upper end of the cylinder 36. The lower surface of the impulse meter 38 is located at a distance of 1.75 D from the mating surface between the cylinder head 13 and the cylinder block. The term "D" means here the diameter of the cylinder bore. The tester measures, using the impulse meter 38, the torque acting on the honeycomb rotor 37 due to the swirl flow (see the arrow in FIG. 7) generated in the cylinder 36 in accordance with the supply of the intake air. Based on the torque thus measured, the lateral angular velocity of the intake flow is obtained.

Figure 8:
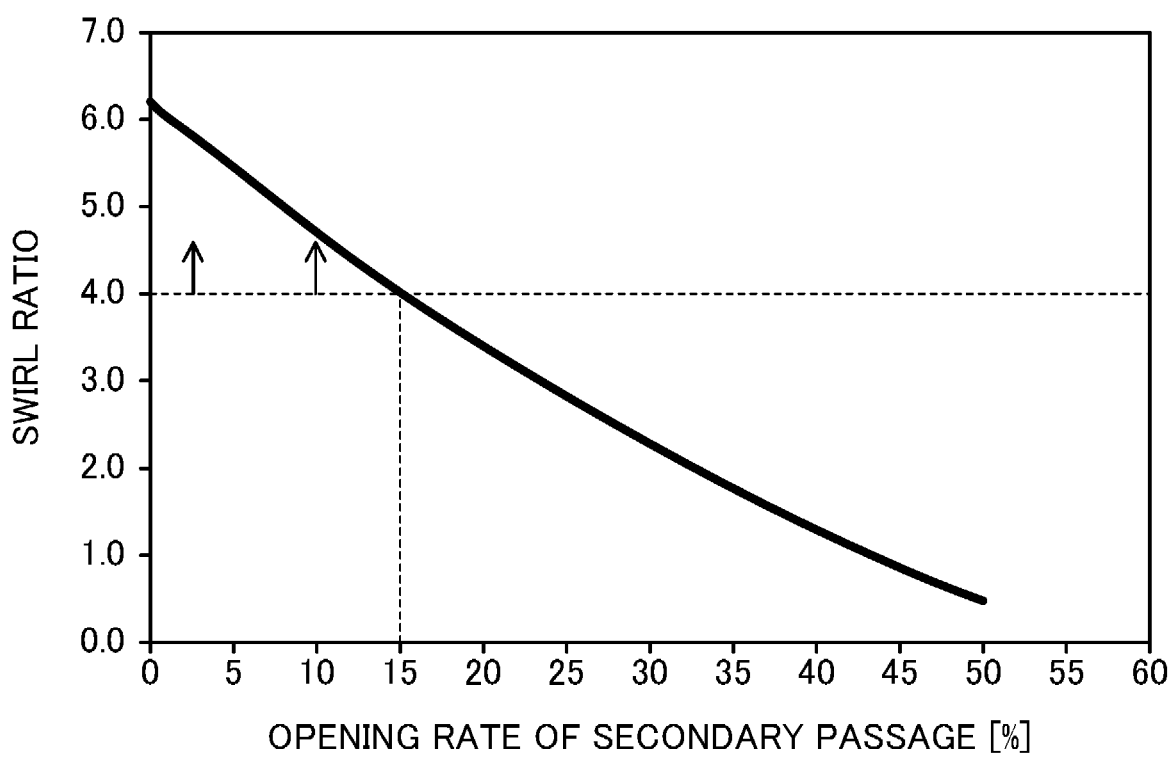
FIG. 8 illustrates a relationship between the opening rate of a secondary passage and the swirl ratio.

FIG. 8 shows a relationship between the opening degree of the swirl control valve 56 and the swirl ratio of the engine 1. In FIG. 8, the opening degree of the swirl control valve 56 is expressed by the opening rate of the secondary passage 402 with respect to its fully opened cross-section. When the swirl control valve 56 is fully closed, the opening rate of the secondary passage 402 is 0%. With an increase in the opening degree of the swirl control valve 56, the opening rate of the secondary passage 402 becomes larger than 0%. When the swirl control valve 56 is fully open, the opening rate of the secondary passage 402 is 100%.

As illustrated in FIG. 8, when the swirl control valve 56 is fully closed, the swirl ratio of the engine 1 is about 6. At a low load of the engine 1 in the SPCCI range (1), the swirl ratio may range from 4 to 6, both inclusive. The opening degree of the swirl control valve 56 may be adjusted to the opening rate ranging from 0% to 15%, both inclusive.

The air-fuel ratio (A/F) of the air-fuel mixture is higher than the stoichiometric air-fuel ratio in the entire combustion chamber 17 at a low load of the engine 1 in the SPCCI range (1). That is, the excessive air ratio λ of the air-fuel mixture in the entire combustion chamber 17 is more than 1 (λ>1). More specifically, the A/F of the air-fuel mixture is 30 or more in the entire combustion chamber 17. This ratio allows for reduction in raw $NO_X$ and improvement in the exhaust gas performance.

In the SPCCI range (1), in the low load operating mode 601 of the engine 1, the air-fuel mixture is stratified between the center and periphery of the combustion chamber 17. At the center of the combustion chamber 17, the spark plug 25 is disposed. The periphery of the combustion chamber 17 is around the center and in contact with the liner of the cylinder 11. The center of the combustion chamber 17 may be defined as a region with a weaker swirl flow, whereas the periphery of the combustion chamber 17 may be defined as a region with a stronger swirl flow.

The fuel concentration of the air-fuel mixture at the center of the combustion chamber 17 is higher than that on the periphery of the combustion chamber 17. Specifically, the A/F of the air-fuel mixture at the center of the combustion chamber 17 ranges from 20 to 30, whereas the A/F of the air-fuel mixture on the periphery of the combustion chamber 17 is 35 or more. The air-fuel ratio is the value as of ignition, which may also apply to the following description.

At a low load of the engine 1 in the SPCCI range (1), the injector 6 injects the fuel into the combustion chamber 17 a plurality of times in the compression stroke (see the reference characters 6011 and 6012 in FIG. 6). Specifically, the injector injects the fuel at the middle stage and final stage of the compression stroke. The mid-stage and post-stage of the compression stroke may be the middle stage and final stage where the compression stroke is evenly divided into three stages of an initial stage, a middle stage, and a final stage with respect to the crank angle.

The fuel injected at the middle stage of the compression stroke diffuses inside the combustion chamber 17 by the ignition time to generate the air-fuel mixture at the center and on the periphery of the combustion chamber 17. The fuel is injected at the post-stage of the compression stroke, that is, in a short time until the ignition, and is thus transported by the swirl flow to the vicinity of the spark plug 25 at the center of the combustion chamber 17 without being diffused much. The fuel forms, together with a portion of the fuel injected at the middle stage of the compression stroke, the air-fuel mixture at the center of the combustion chamber 17. As described above, the air-fuel mixture is stratified at the center and on the periphery of the combustion chamber 17.

After the end of the fuel injection, the spark plug 25 ignites the air-fuel mixture at the center of the combustion chamber 17 at predetermined timing before compression top dead center (see the reference character 6013). At this time, the air-fuel mixture contains the fuel at a relatively high concentration at the center of the combustion chamber 17, which improves the ignitability and stabilizes the SI combustion by the flame propagation. The stabilization of the SI combustion allows for the start of the CI combustion at an appropriate timing. That is, in the SPCCI combustion, the controllability of the CI combustion improves. As a result, at a low load of the engine 1 in the SPCCI range (1), it is possible to achieve both the reduction in combustion noise, and the improvement in fuel efficiency due to a shorter combustion period.

<Engine Control in Medium-Load Operation in SPCCI Range (1)>

In FIG. 6, the reference character 602 denotes an example including fuel injection times (reference characters 6021 and 6022), an ignition time (reference character 6023), and a combustion waveform (reference character 6024), in a medium load operation of the engine 1 in the SPCCI range (1).

The EGR system 55 introduces the EGR gas into each combustion chamber 17 in a medium load operation of the engine 1 as in a low load operation. Specifically, in a low load and a lower speed operation of the engine 1 within the medium load range, the positive overlap period, in which both the intake and exhaust valves 21 and 22 are open, is provided near the exhaust top dead center. This leads to the internal EGR in which a part of the exhaust gas discharged from the inside of the combustion chamber 17 to the intake and exhaust ports 18 and 19 returns and is reintroduced into the combustion chamber 17. That is, the internal EGR gas is introduced into the combustion chamber 17.

In a high load or a high speed operation of the engine 1 within the medium load range, the supercharger 44 is turned on to ensure a filling amount of the intake air required with an increase in the amount of fuel injection. When the supercharger 44 is turned on to supercharge the gas in the intake passage 40, the pressure inside the intake passage 40 is relatively high. The residual gas (i.e., hot burned gas) in the combustion chamber 17 is thus scavenged in the positive overlap period as described above.

In a medium load operation of the engine 1, external EGR is performed in which the exhaust gas cooled by the EGR cooler 53 is introduced through the EGR passage 52 into the combustion chamber 17. That is, the external EGR gas with a lower temperature than that of the internal EGR gas is introduced into the combustion chamber 17. The introduction of at least one of the internal EGR gas and the external EGR gas into the combustion chamber 17 leads to adjustment of the temperature in the combustion chamber 17 to an appropriate temperature. Note that the EGR rate increases with an increase in the load on the engine 1.

In a medium load operation of the engine 1, the swirl control valve 56 is fully closed or at a predetermined closing angle as in a low load operation. Accordingly, a strong swirl flow with a swirl ratio of 4 or more occurs in the combustion chamber 17. With an increase in the strength of the swirl flow, the turbulent energy inside the combustion chamber 17 increases, which causes rapid propagation of the flame in the SI combustion and stabilization of the SI combustion. The stabilization of the SI combustion increases the controllability of the CI combustion. This causes an appropriate timing of the CI combustion in the SPCCI combustion. As a result, combustion noise decreases and fuel efficiency improves. In addition, the variation in the torque among the cycles decreases.

The air-fuel ratio (A/F) of the air-fuel mixture is equal to the stoichiometric air-fuel ratio (i.e., A/F=14.7) in the entire combustion chamber 17 in a medium load operation of the engine 1. At the stoichiometric air-fuel ratio, a three-way catalyst purifies the exhaust gas discharged from the combustion chamber 17 so that the engine 1 has an excellent exhaust gas performance. The A/F of the air-fuel mixture may fall within the purification window of the three-way catalyst. Therefore, the excessive air ratio λ of the air-fuel mixture may be 1.0± 0.2.

In a medium load operation of the engine 1, the injector 6 injects the fuel into the combustion chamber 17 separately in the intake and compression strokes (see the reference characters 6021 and 6022 in FIG. 6). Specifically, the injector performs first injection 6021 to inject the fuel in the period from the middle stage to final stage of the intake stroke, and second injection 6022 to inject the fuel at a second half of the compression stroke. The middle stage and final stage of the intake stroke may be the middle stage and final stage where the intake stroke is evenly divided into three stages of an initial stage, a middle stage, and a final stage with respect to the crank angle. On the other hand, first and second halves of the compression stroke may be the first and second halves of the compression stroke when the compression stroke is divided into two of first and second halves with respect to the crank angle.

In the first injection 6021, the fuel is injected at a time away from the ignition time. At the time of the injection, the piston 3 is away from top dead center, the fuel reaches a squish area 171 outside the cavity 31 and is distributed substantially evenly in the combustion chamber 17 to generate air-fuel mixture. In the second injection 6022, the fuel is injected when the piston 3 is closer to compression top dead center and thus enters the cavity 31 to generate air-fuel mixture in the area inside of the cavity 31.

In accordance with the second injection 6022 for injecting the fuel into the cavity 31, the gas flow occurs in the area inside the cavity 31. If a longer time is required to the ignition, the turbulent energy in the combustion chamber 17 weakens with the progress of the compression stroke. However, the second injection 6022 is closer to the ignition time than the first injection 6021, which allows the spark plug 25 to ignite the air-fuel mixture in the area inside the cavity 31 while maintaining the large turbulent energy in the cavity 31. Accordingly, the speed of the SI combustion increases. With an increase in the combustion rate of the SI combustion, the SI combustion stabilizes, thereby leading to improvement in the controllability of the CI combustion by the SI combustion.

In the second injection 6022 at the second half of the compression stroke, latent heat of fuel vaporization reduces the temperature in the combustion chamber 17 to reduce induction of abnormal combustion such as pre-ignition or knocking. The fuel injected in the second injection 6022 can be stably burned by the flame propagation. The ratio between the amount of the first injection 6021 and the amount of the second injection 6022 may be 95:5, for example.

In the combustion chamber 17, a substantially homogeneous air-fuel mixture with an excessive air ratio $\lambda$ of $1.0\pm 0.2$ as a whole is generated by the injector 6 performing the first and second injections 6021 and 6022. Since the air-fuel mixture is substantially homogeneous, fuel efficiency improves with a decrease in unburned loss and the exhaust gas performance improves with a decrease in smoke (soot).

The spark plug 25 ignites the air-fuel mixture at a predetermined timing before compression top dead center (see the reference character 6023), thereby causing the combustion of the air-fuel mixture by flame propagation. After the combustion has started by the flame propagation, the autoignition of the unburned air-fuel mixture is performed, initiating the CI combustion. The fuel injected in the second injection 6022 is mainly subjected to the SI combustion. The fuel injected in the first injection 6021 is mainly subjected to the CI combustion.

<Engine Control in High Load Operation in SPCCI Range (1)>

In FIG. 6, reference character 603 denotes an example including a fuel injection time (reference character 6031), an ignition time (reference character 6032), and a combustion waveform (reference character 6033) in a high load operation of the engine 1 within the SPCCI range (1).

The EGR system 55 also introduces the EGR gas into each combustion chamber 17 in a high load operation of the engine 1.

Specifically, in a high load operation of the engine 1, the external EGR is performed in which the exhaust gas cooled by the EGR cooler 53 is introduced through the EGR passage 52 into the combustion chamber 17. The EGR rate continuously increases with an increase in the load on the engine 1 within the medium and high load ranges of in the SPCCI range (1). The introduction of the external EGR gas cooled by the EGR cooler 53 into the combustion chamber 17 leads to adjustment of the temperature in the combustion chamber 17 to an appropriate temperature and reduction in induction of abnormal combustion, such as pre-ignition or knocking, of the air-fuel mixture.

At a load on the engine 1 closer to the full load, there is a need to increase the amount of fresh air to be introduced into the combustion chamber 17 to cope with an increase in the amount of fuel. For this purpose, at a load of the engine 1 closer to the full load in the SPCCI range (1), the EGR rate of the external EGR may decrease.

In a high load operation of the engine 1 as well, the positive overlap period, in which both the intake and exhaust valves 21 and 22 are open, is provided near the exhaust top dead center.

In a high load operation of the engine 1 as well, the supercharger 44 is turned on (see S/C ON) throughout the high load range to increase the supercharging pressure. This allows for scavenge of the residual gas (i.e., the burned gas) in the combustion chamber 17 in the positive overlap period.

In a high load operation of the engine 1 as well, the swirl control valve 56 is fully closed or at a predetermined closing angle. Accordingly, a strong swirl flow with a swirl ratio of 4 or more occurs in the combustion chamber 17.

In a high load operation of the engine 1, the air-fuel ratio (A/F) of the air-fuel mixture is lower than or equal to the stoichiometric air-fuel ratio (i.e., the excessive air ratio of the air-fuel mixture is expressed by $\lambda \leq 1$) in the entire combustion chamber 17.

In a high load operation mode 603 of the engine 1, the injector 6 starts injecting the fuel in the intake stroke (see the reference character 6031 in FIG. 6). Specifically, the fuel injection 6031 may start injecting the fuel at 280° CA before compression top dead center. The fuel injection 6031 may continue over the intake stroke and end in the compression stroke. The fuel injection 6031 may start at the first half of the intake stroke, which allows the fuel spray to hit the opening edge of the cavity 31. A part of the fuel enters the squish area 171 of the combustion chamber 17, that is, the area outside the cavity 31 (see FIG. 2), whereas the rest enters the area inside the cavity 31. At this time, the swirl flow is stronger on the periphery of the combustion chamber 17, and weaker at the center of the combustion chamber 17. Accordingly, the fuel that has entered the area inside the cavity 31 enters more inward than the swirl flow.

The fuel that has entered the swirl flow remains in the swirl flow from the intake stroke to the compression stroke and forms the air-fuel mixture for the CI combustion on the periphery of the combustion chamber 17. The fuel that has entered the inside of the swirl flow also remains inside the swirl flow from the intake stroke to the compression stroke and forms the air-fuel mixture for the SI combustion at the center of the combustion chamber 17.

In a high load operation of the engine 1, the fuel concentration of the air-fuel mixture is set to be higher on the periphery of the combustion chamber 17 than at the center. In addition, the amount of fuel in the air-fuel mixture is set to be larger on the periphery of the combustion chamber 17 than at the center.

Specifically, the excessive air ratio $\lambda$ of the air-fuel mixture is 1 or lower in one preferred embodiment at the center of the combustion chamber 17, and 1 or lower and, in one preferred embodiment, lower than 1 on the periphery of the combustion chamber 17. At the center of the combustion chamber 17, the air-fuel ratio (A/F) of the air-fuel mixture may range from 13 to the stoichiometric air-fuel ratio (i.e., 14.7), for example. Alternatively, at the center of the combustion chamber 17, the air-fuel ratio of the air-fuel mixture may be higher than the stoichiometric air-fuel ratio.

On the periphery of the combustion chamber 17, the air-fuel ratio of the air-fuel mixture may range from 11 to the stoichiometric air-fuel ratio, for example, and may range from 11 to 12 in one preferred embodiment. The excessive air ratio $\lambda$ less than 1 on the periphery of the combustion chamber 17 increases the amount of the fuel in the air-fuel mixture on the periphery, whereby the latent heat of fuel vaporization decreases the temperature. In the combustion chamber 17, the air-fuel ratio of the air-fuel mixture may range from 12.5 to the stoichiometric air-fuel ratio, for example, and may range from 12.5 to 13 in one preferred embodiment.

Near compression top dead center, the spark plug 25 ignites the air-fuel mixture in the combustion chamber 17 (see the reference character 6032). The spark plug 25 may perform the ignition, for example, after compression top dead center. Since the spark plug 25 is located at the center of the combustion chamber 17, the ignition of the spark plug 25 starts the SI combustion of the air-fuel mixture by the flame propagation at the center. Since the fuel concentration of the air-fuel mixture is higher around the spark plug 25, the flame stably propagates after the ignition of the spark plug 25 in the SPCCI combustion.

With an increase in the load of the engine 1, the amount of the fuel injection and the temperature in the combustion chamber 17 increase, which creates a condition easily starting the CI combustion earlier. That is, a higher load of the engine 1 tends to cause abnormal combustion, such as pre-ignition and knocking, of the air-fuel mixture. However, as described above, the temperature on the periphery of the combustion chamber 17 decreases due to the latent heat of fuel vaporization. This reduces start of the CI combustion immediately after the spark ignition of the air-fuel mixture.

At a high load of the engine 1 in the SPCCI combustion, the stratification of the air-fuel mixture inside the combustion chamber 17 and the generation of a strong swirl flow inside the combustion chamber 17 allow sufficient SI combustion before the start of the CI combustion. This results in reduction in combustion noise and an excessive increase in combustion temperature to reduce $NO_x$. In addition, the variation in the torque among the cycles decreases.

A lower temperature on the periphery of the combustion chamber 17 makes the CI combustion more moderate, which is advantageous in reducing combustion noise. In addition, since the CI combustion requires a shorter combustion period, torque and thermal efficiency improve at a high load of the engine 1. Therefore, in the engine 1, the SPCCI combustion is performed within a high load range, thereby improving fuel efficiency while reducing combustion noise.

<Engine Control in CI Range (2)>

At a high speed of the engine 1, a shorter time is required for the crank angle to change by 1°. For example, in the high speed and high load range, it is thus difficult to stratify the air-fuel mixture in the combustion chamber 17 to perform the SPCCI combustion. On the other hand, since the engine 1 has a high geometric compression ratio. Thus, if the SI combustion is to be performed particularly in a high load range, abnormal combustion such as knocking may occur. To address the problem, the engine 1 performs a new CI combustion mode in a higher speed operation in the CI range (2). The CI range (2) extends over all the ranges in the load direction from low to high loads.

This CI combustion utilizes what is called a "broken reaction zone". In the broken reaction zone, the conditions inside the combustion chamber 17 are as follows. A lean air-fuel mixture and/or a strong flow in the combustion chamber 17 do(es) not allow the progress of the combustion by the flame propagation, even after the spark plug 25 has ignited the air-fuel mixture. The combustion mode in the CI range (2) is based on the following new finding obtained when the air-fuel mixture was viewed microscopically. If the spark plug 25 ignites the air-fuel mixture in the broken reaction zone, the flame does not go out but is stored while being unable to cause the flame propagation.

In FIG. 6, reference character 604 denotes an example including fuel injection times (reference characters 6041 and 6043), an ignition time (reference character 6042), and a combustion waveform (reference character 6044), in a high load operating state 604 of the engine 1 in the SPCCI range (2).

The air-fuel ratio (A/F) of the air-fuel mixture is basically equal to the stoichiometric air-fuel ratio (i.e., A/F=14.7) in the entire combustion chamber 17 in an operation of the engine 1 in the CI range (2). The excessive air ratio λ of the air-fuel mixture may be 1.0± 0.2. In a high load range including the all loads within the CI range (2), the excessive air ratio λ of the air-fuel mixture may be lower than 1.

As shown in the map 501 in FIG. 5, in an operation of the engine 1 in the CI range (2), the supercharger 44 is turned on (see S/C ON) throughout all the ranges of the engine 1 to increase the supercharging pressure.

Figure 9:
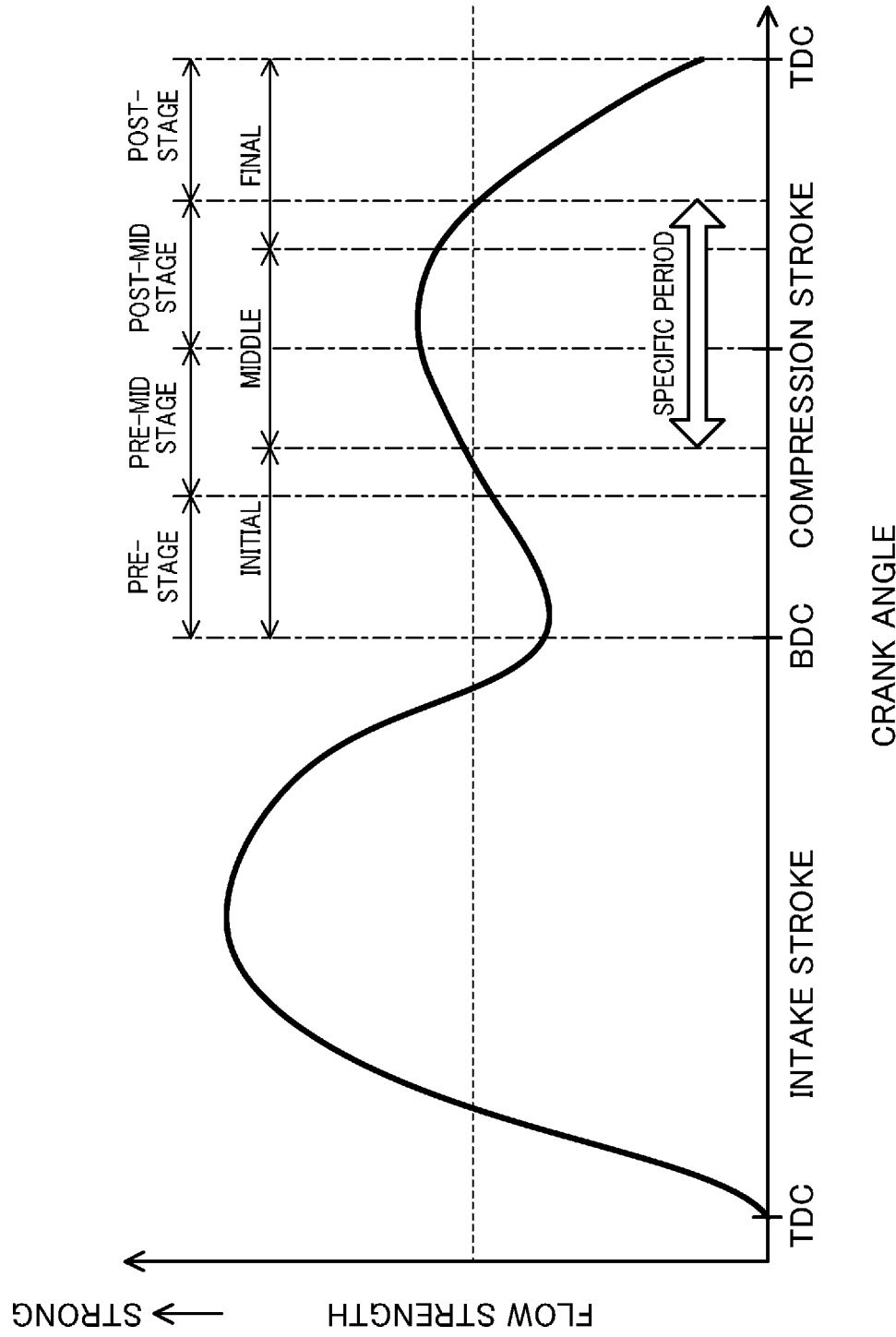
FIG. 9 illustrates a change in the flow strength in the combustion chamber from an intake stroke to a compression stroke.

FIG. 9 illustrates a change in the flow strength in the combustion chamber 17 from the intake stroke to the compression stroke. In an operation of the engine 1 in the CI range (2), the swirl control valve 56 is fully open as shown in the map 502 in FIG. 5. Accordingly, no swirl flow but only a tumble flow occurs in the combustion chamber 17. Such full opening of the swirl control valve 56 improves the filling efficiency, while reducing pump losses at a high speed of the engine 1.

As the intake air flows into the combustion chamber 17 in the intake stroke, a tumble flow occurs and the flow in the combustion chamber 17 gradually strengthens. The flow in the combustion chamber 17 that has strengthened in the intake stroke weakens once at the post-stage of the intake stroke. However, with a lift of the piston 3 toward top dead center in the compression stroke, the flow in the combustion chamber 17 strengthens again due to what is called a "spin-up phenomenon". As indicated by the white arrow in FIG. 9, the flow in the combustion chamber 17 has a predetermined strength (see the broken line) or more in the specific period. The specific period extends from the start of a middle stage, where the compression stroke is divided into three stages of an initial stage, a middle stage, and a final stage, to the end of a post-mid stage, where the compression stroke is divided into four stages of a pre-stage, a pre-mid stage, a post-mid stage, and a post-stage. In the specific period, the tumble ratio in the combustion chamber 17 is equal to or higher than a predetermined value. The "tumble ratio" is the value obtained by dividing the angular velocity ω of the intake air around an axis by the angular velocity ωc of the crankshaft 15. The axis is parallel to the crankshaft 15 passing through the center of gravity of the combustion chamber 17, whose position varies depending on a change in the volume of the combustion chamber 17. The angular velocity ω of the intake air can be obtained as follows. Specifically, the inside of the combustion chamber 17 is divided into a large number of tiny regions corresponding to tiny crank angles from the start of the intake stroke to the end of the compression stroke. The angular momentum L of the mass points (air) of the tiny regions around the axis and the inertia momenta I of the mass points of the tiny regions are obtained. The angular momenta L of all the tiny regions are summed up throughout the tiny crank angles. The sum is divided by the sum of the inertia momenta I of all the tiny regions throughout the tiny crank angles. As a result, the angular velocity ω of the intake air can be obtained.

Formation of the air-fuel mixture with a low fuel concentration with respect to the stoichiometric air-fuel ratio in the combustion chamber 17 in or before the specific period does not allow combustion by the flame propagation, even after the spark plug 25 ignites the air-fuel mixture in the specific period. That is, in the CI range (2), the spark plug 25 ignites the air-fuel mixture when the conditions inside the combustion chamber 17 fall within the broken reaction zone. Accordingly, the flame is stored in the combustion chamber 17 without starting the combustion by the flame propagation.

After that, as the crank angle advances, the flow in the combustion chamber 17 weakens. In addition, the fuel is additionally supplied into the combustion chamber 17 to increase the fuel concentration of the air-fuel mixture. Then, the conditions inside the combustion chamber 17 fall out of the broken reaction zone. At the post-stage of the compression stroke, motoring increases the temperature and pressure inside the combustion chamber 17. As a result, the flame stored starts the combustion of the air-fuel mixture at the post-stage of the compression stroke or in the expansion stroke.

Next, fuel injection control and ignition control will be described in detail with reference to FIG. 6. In an operation of the engine 1 in the CI range (2), the injector 6 performs the fuel injection (i.e., the first fuel injection 6041) in the intake stroke. The first fuel injection may be performed at once or in a divided manner, for example. The start of the fuel injection in the intake stroke allows for formation of a homogeneous or substantially homogeneous air-fuel mixture in the combustion chamber 17. The air-fuel mass ratio A/F or a gas-fuel mass ratio G/F, in which the gas includes air, of the air-fuel mixture formed at this time is higher than the stoichiometric air-fuel ratio. The amount of the first fuel injection 6041 is determined by the load of the engine 1 and the division ratio between the first fuel injection 6041 and the second fuel injection 6043 described later. Note that the fuel injection period varies depending on the amount of the first fuel injection 6041. The start of the first fuel injection 6041 may be set as appropriate in accordance with the amount of the first fuel injection 6041 so as to form the air-fuel mixture with a low fuel concentration with respect to the stoichiometric air-fuel ratio in the combustion chamber 17 at least in or before the specific period described above.

After the end of the first fuel injection, the spark plug 25 ignites the air-fuel mixture (see the reference character 6042). An upper illustration 1001 of FIG. 10 illustrates an ignition time in a high load operation of the engine 1 in the CI range (2). The speed N1 in FIG. 10 corresponds to the speed N1 of the map shown in FIG. 5. In the upper illustration 1001 of FIG. 10, the vertical axis represents the crank angle, which advances toward the top of the vertical axis.

In the upper illustration 1001 of FIG. 10, the hatched range indicates the ignition time of the spark plug 25. The spark plug 25 ignites the air-fuel mixture at an appropriate timing within the hatched range.

The spark plug 25 ignites the air-fuel mixture, within the compression stroke, at or before the post-mid stage. This allows for storage of the flame in the combustion chamber 17 without allowing the progress of the combustion by the flame propagation. The flame is dispersed or diffused by the flow in the combustion chamber 17. As is apparent from FIG. 9, the ignition at a too early or late phase within the compression stroke means that the air-fuel mixture is ignited when the flow inside the combustion chamber 17 is weak. Thus, the ignition time has an advance limit (i.e., the upper line in the upper illustration 1001) and a retard limit (i.e., the lower line in the upper illustration 1001) so that the spark plug 25 ignites the air-fuel mixture, when the conditions inside the combustion chamber 17 fall within the broken reaction zone, as shown in the upper illustration 1001 of FIG. 10. The spark plug 25 may ignite the air-fuel mixture at the middle stage, for example, where the compression stroke is divided into three stages of an initial stage, a middle stage, and a final stage.

The ignition of the air-fuel mixture by the spark plug 25 in the CI range (2) is much more advanced than minimum advance for best torque (MBT), which can be set where the SI combustion is performed in the same operating state as illustrated by the one-dot-chain lines in the upper illustration 1001 of FIG. 10. The MBT is found at the post-stage of the compression stroke, for example.

The ignition time may vary in accordance with to the magnitude of the speed of the engine 1. In the example of the upper illustration 1001, the ignition time advances with an increase in the speed of the engine 1. The variation in the advance limit with an increase in the speed of the engine 1 is larger than the variation in the retard limit. That is, the upper line has a steeper slope than the lower line in the upper illustration 1001.

The spark plug 25 may perform a plurality of ignitions within the specific period. This increases the number of flames generated in the combustion chamber 17 and allows a strong flow in the combustion chamber 17 to diffuse the large number of flames into the combustion chamber 17. Accordingly, the ignitability of the air-fuel mixture improves and the combustion period of the air-fuel mixture further shortens.

In the period of the compression stroke after the spark plug 25 has ignited the air-fuel mixture, the injector 6 injects the fuel into the combustion chamber 17 (i.e., the second fuel injection 6043). The fuel concentration of the air-fuel mixture in the combustion chamber 17 increases. The second fuel injection 6043 makes the A/F or G/F of the air-fuel mixture lower than or equal to the stoichiometric air-fuel ratio. With an increase in the fuel concentration of the air-fuel mixture, the flow in the combustion chamber 17 weakens, whereby the conditions inside the combustion chamber 17 fall out of the broken reaction zone. In addition, the temperature and the pressure inside the combustion chamber 17 are increased by motoring as the piston comes closer to compression top dead center. Accordingly, near compression top dead center, the flame stored starts the combustion of the air-fuel mixture by the autoignition at once (see the reference character 6044). The center of gravity of this combustion is closer to compression top dead center, which improves the thermal efficiency of the engine 1. In addition, this combustion mode requires a shorter combustion period, and thus, reduces knocking.

In accordance with the fuel concentration of the air-fuel mixture in the combustion chamber 17, whether or not the conditions inside the combustion chamber 17 fall out of the broken reaction zone changes. A change in the time when the conditions of the combustion chamber 17 fall out of the broken reaction zone changes the start of the combustion of the air-fuel mixture. The amount of the second fuel injection 6043 may thus be adjusted as appropriate to start the combustion of the air-fuel mixture at an appropriate timing.

As illustrated in FIG. 6, the second fuel injection 6043 may be performed after the spark plug 25 has ignited the air-fuel mixture. A delay in the end of the fuel injection 6043 shortens the vaporization time of the fuel injected in the second fuel injection 6043, which may be disadvantageous in terms of exhaust gas emission performance or fuel efficiency. The start of the second fuel injection 6043 may be set as appropriate based on the amount of the second fuel injection 6043 not to cause a delay of the injection end of the second fuel injection 6043. For example, the lower illustration 1002 of FIG. 10 illustrates the start of the second fuel injection 6043. In the lower illustration 1002 of FIG. 10, the vertical axis of represents the crank angle, which advances toward the top of the vertical axis. In the lower illustration 1002 of the figure, the hatched area represents the start of the second fuel injection 6043. The injector 6 performs the second fuel injection 6043 at an appropriate timing within the hatched range.

With a change in the start of the second fuel injection 6043, the time when the conditions inside the combustion chamber 17 fall out of the broken reaction zone changes. Thus, with a change in the start of the second fuel injection 6043 by the injector 6, the start of the combustion of the air-fuel mixture changes. The start of the second fuel injection 6043 may be adjusted to start the combustion of the air-fuel mixture at an appropriate timing.

The start of the second fuel injection 6043 may change in accordance with the magnitude of the speed of the engine 1. Specifically, with an increase in the speed of the engine 1, the ignition timing advances. In accordance with the advance, the start of the second fuel injection 6043 may advance. In the example of the lower illustration 1002, the start of the second injection advances with an increase in the speed of the engine 1. The variation in the advance limit (i.e., the slope of the upper line in the lower illustration 1002) with an increase in the speed of the engine 1 is larger than the variation in the retard limit (i.e., the slope of the lower line in the lower illustration 1002).

The ratio between the amounts of the first and second injection 6041 and 6043 may be set as appropriate.

The EGR system 55 introduces the external and/or internal EGR gas into the combustion chamber 17 in an operation of the engine 1 in the CI range (2). The EGR rate in the combustion chamber 17 may be adjusted to start the combustion of the air-fuel mixture at an appropriate timing.

In the CI range (2), water may be injected into the combustion chamber 17 at an appropriate timing in the compression stroke to start the combustion of the air-fuel mixture at an appropriate timing.

In the maps 501 and 502 shown in FIG. 5, the combustion mode described above may be employed throughout the entire CI range (2) or the load range on the R-L line in the CI area (2).

<Control Process of Engine>

FIG. 11 illustrates a flowchart of the control of the engine 1 described above and executed by the ECU 10.

First, in step S1 after the start of the flow, the ECU 10 reads signals of the various sensors SW1 to SW16. In the subsequent step S2, the ECU 10 determines whether or not the operating state of the engine 1 is within the high speed range. The high speed range corresponds to the CI range (2) described above. In step S2, the ECU 10 may determine whether or not the engine speed is equal to or higher than N1. If the determination in step S2 is YES, the control process proceeds to step S3. If the determination in step S2 is NO, the process proceeds to a step S6.

Steps S3 to S5 are the control steps within the CI range (2). The steps S3 to S5 proceed in this order.

First, in step S3, the ECU 10 executes the first fuel injection by the injector 6. Accordingly, leaner air-fuel mixture with respect to the stoichiometric air-fuel ratio is generated in the combustion chamber 17. In the subsequent step S4, the ECU 10 executes ignition by the spark plug 25 at a predetermined time. As described above, the spark plug 25 performs the ignition before the post-mid stage of the compression stroke. In step S5, the ECU 10 executes then the second fuel injection by the injector 6. As a result, near compression top dead center, the flame made in advance in the combustion chamber 17 starts the combustion of the air-fuel mixture at once by autoignition.

On the other hand, in step S6, the control in the SPCCI range (1) is performed in accordance with the load of the engine 1.

<Variations of Engine>

Note that application of the disclosed technique is not limited to the engine 1 with the configuration described above. The engine may employ various configurations.

FIG. 12 shows a configuration of an engine 100 according to a variation. The engine 100 includes a turbocharger 70 in place of the mechanical supercharger 44.

The turbocharger 70 includes a compressor 71 in the intake passage 40 and a turbine 72 in the exhaust passage 50. The turbine 72 is rotated by the exhaust gas flowing through the exhaust passage 50. The compressor 71 is rotated by the rotational drive of the turbine 72 and supercharges the gas in the intake passage 40 to be introduced into the combustion chamber 17.

The exhaust passage 50 includes an exhaust bypass passage 73. The exhaust bypass passage 73 connects parts of the exhaust passage 50 upstream and downstream of the turbine 72 as to bypass the turbine 72. The exhaust bypass passage 73 includes a waste gate valve 74. The waste gate valve 74 adjusts the flow rate of the exhaust gas flowing through the exhaust bypass passage 73.

In this exemplary configuration, the turbocharger 70, the bypass passage 47, the air bypass valve 48, the exhaust bypass passage 73, and the waste gate valve 74 constitute a supercharging system 49 in the intake and exhaust passages 40 and 50.

The engine 100 switches opening/closing of the air bypass valve 48 and the waste gate valve 74 to or not to cause the turbocharger 70 to supercharge the gas to be introduced into the combustion chamber 17.

When the gas introduced into the combustion chamber 17 is not supercharged, the waste gate valve 74 opens. Accordingly, the gas flowing through the exhaust passage 50 bypasses the turbine 72, that is, passes not through the turbine 72 but through the bypass passage 73 into the catalyst converters. Then, the turbine 72 does not receive the flow of the exhaust gas and thus does not drive the turbocharger 70. At this time, the air bypass valve 48 is fully open. As a result, the gas flowing through the intake passage 40 flows through none of the compressor 71 or the intercooler 46 but through the bypass passage 47 into the surge tank 42.

When the gas to be introduced into the combustion chamber 17 is supercharged, the waste gate valve 74 is not fully open but closed slightly. Accordingly, at least a portion of the exhaust gas flowing through the exhaust passage 50 passes through the turbine 72 and flows to the catalyst converters. Then, the turbine 72 rotates upon receipt of the exhaust gas and drives the turbo turbocharger 70. When the turbocharger 70 is driven, the gas in the intake passage 40 is supercharged by the rotation of the compressor 71. At this time, if the air bypass valve 48 is open, a portion of the gas that has passed through the compressor 71 flows back from the surge tank 42 through the bypass passage 47 to the upstream side of the compressor 71. The supercharging pressure of the gas inside the intake passage 40 can be controlled by adjusting the opening degree of the air bypass valve 48 as in the case using the mechanical supercharger described above.

Whether or not the turbocharger 70 supercharges the gas in the intake passage 40 may be determined in accordance with a map 503 shown in FIG. 13, for example. That is, the turbocharger 70 may not perform the supercharging in the low load range in the SPCCI range (1)(see T/C OFF), whereas the turbocharger 70 may perform the supercharging in the medium and high load ranges in the SPCCI range (1) as well as in the CI range (2) (see T/C ON). In the low load range, a lower torque is required. The supercharging is thus less needed and the air-fuel mixture is leaner with respect to the stoichiometric air-fuel ratio. As a result, the temperature of the exhaust gas decreases. In order to maintain the three-way catalysts 511 and 513 at the activation temperatures, the waste gate valve 74 may open to bypass the turbine 72, thereby reducing heat dissipation in the turbine 72 and supplying hot exhaust gas to the three-way catalysts 511 and 513.

The operation of the engine 100 including the turbocharger 70 may be controlled in accordance with the flowchart shown in FIG. 11. The engine 100 also can improve thermal efficiency, while reducing abnormal combustion at a high speed of the engine 100.

Although not shown, the disclosed technology is applicable to a naturally aspirated engine without any supercharger.

<Other Exemplary Configuration>

In the configuration described above, the ignition is performed in an operation of the engine 1 in the CI range (2) when the flow strength in the combustion chamber 17 is equal to or greater than a predetermined value (see the arrow in the specific period in FIG. 9). Alternatively, the ignition may not be performed when the flow strength is equal to or greater than the predetermined value. The broken reaction zone relates to the two parameters of the fuel concentration of the air-fuel mixture and the flow strength in the combustion chamber 17. However, ignition of the air-fuel mixture with an A/F or a G/F higher than the stoichiometric air-fuel ratio allows storage of a flame without allowing the progress of the flame propagation. In this case, the second fuel injection 6043 is performed after the ignition, whereby the fuel concentration of the mixture increases and the conditions in the combustion chamber 17 fall out of the broken reaction zone. Accordingly, the combustion of the air-fuel mixture starts by autoignition near compression top dead center.

In the configuration described above, the first fuel injection 6041 generates the homogeneous or substantially homogeneous air-fuel mixture with the A/F or G/F higher than the stoichiometric air-fuel ratio in the combustion chamber 17. The time of the first fuel injection 6041 may be adjusted to locally generate the air-fuel mixture with an A/F or a G/F higher than the stoichiometric air-fuel ratio near the spark plug 25 at the ignition timing.

In addition to the injector for directly injecting the fuel into the combustion chamber 17, a port injector facing the inside of the intake port may be provided. In particular, the first fuel injection for injecting the fuel in the intake stroke may be performed by the port injector.

The engine 1 may include an ignition unit that causes an arc discharge or a plasma discharge in each combustion chamber 17 in place of the spark plug 25 that performs the spark discharge.

DESCRIPTION OF REFERENCE CHARACTERS

1, 100 Engine
6 Injector (Fuel Supply Unit)
10 ECU (Control Unit)
17 Combustion Chamber
25 Spark Plug (Ignition Unit)

S3 First Fuel Supply Step
S4 Ignition Step
S5 Second Fuel Supply Step

The invention claimed is:
1. An engine control device comprising:
a combustion chamber of an engine that executes a cycle including an intake stroke, a compression stroke, an expansion stroke, and an exhaust stroke;
a spark plug arranged in the combustion chamber; and
an injector configured to supply a fuel into the combustion chamber, wherein
the injector supplies the fuel in the combustion chamber at a timing when the spark plug makes a flame in the combustion chamber so that an air-fuel mixture is generated at least around the spark plug, the air-fuel mixture having an air-fuel mass ratio A/F or a gas-fuel mass ratio G/F, in which gas includes air, higher than a stoichiometric air-fuel ratio,
the spark plug is configured to make the flame in the combustion chamber at a predetermined timing in the compression stroke;
the injector is configured to supply the fuel into the combustion chamber in the compression stroke to increase a fuel concentration of the air-fuel mixture in the combustion chamber after the spark plug has made the flame; and
a total amount of the fuel supplied into the combustion chamber in the compression stroke from ignition to a start of combustion is smaller than a total amount of the fuel supplied to the combustion chamber before the ignition.
2. The engine control device of claim 1, wherein
the spark plug makes the flame during or before a post-mid stage, where the compression stroke is divided into four stages of a pre-stage, a pre-mid stage, the post-mid stage, and a post-stage.
3. The engine control device of claim 2, wherein
the spark plug makes the flame at a middle stage, where the compression stroke is divided into three stages of an initial stage, the middle stage, and a final stage.
4. The engine control device of claim 1, wherein
the injector is configured to supply the fuel into the combustion chamber so that the A/F or G/F of the air-fuel mixture in the combustion chamber is lower than or equal to the stoichiometric air-fuel ratio after the spark plug has made the flame.
5. The engine control device of claim 1, wherein
the engine has a geometric compression ratio of 14 or more.
6. An engine control method of executing a cycle including an intake stroke, a compression stroke, an expansion stroke, and an exhaust stroke in a combustion chamber of an engine, the method comprising:
a first fuel supply step for supplying a fuel into the combustion chamber using an injector at a timing when a spark plug makes a flame in the combustion chamber so that an air-fuel mixture is generated at least around the spark plug, the air-fuel mixture having an air-fuel mass ratio A/F or a gas-fuel mass ratio G/F, in which gas includes air, higher than a stoichiometric air-fuel ratio;
after the first fuel supply step, an ignition step of making the flame in the combustion chamber in the compression stroke using the spark plug; and
after the ignition step, a second fuel supply step of supplying the fuel into the combustion chamber in the compression stroke using the injector to increase a fuel concentration of the air-fuel mixture in the combustion chamber, wherein a total amount of the fuel supplied into the combustion chamber in the compression stroke from ignition to a start of combustion is smaller than a total amount of the fuel supplied to the combustion chamber before the ignition.

7. The engine control method of claim 6, wherein
the spark plug makes the flame during or before a post-mid stage, where the compression stroke is divided into four stages of a pre-stage, a pre-mid stage, the post-mid stage, and a post-stage.

8. The engine control method of claim 7, wherein
the spark plug makes the flame at a middle stage, where the compression stroke is divided into three stages of an initial stage, the middle stage, and a final stage.

9. The engine control method of claim 6, wherein
the injector supplies the fuel into the combustion chamber in the second fuel supply step so that the A/F or G/F of the air-fuel mixture in the combustion chamber is lower than or equal to the stoichiometric air-fuel ratio.

10. The engine control method of claim 6, wherein
the engine has a geometric compression ratio of 14 or more.

11. An engine control method of executing a cycle including an intake stroke, a compression stroke, an expansion stroke, and an exhaust stroke in a combustion chamber of an engine, the method comprising:

a first fuel supply step for supplying a fuel into the combustion chamber using an injector at a timing when a spark plug makes a flame in the combustion chamber so that an air-fuel mixture is generated at least around the spark plug, the air-fuel mixture having an air-fuel mass ratio A/F or a gas-fuel mass ratio G/F, in which gas includes air, higher than a stoichiometric air-fuel ratio;

after the first fuel supply step, an ignition step of making the flame in the combustion chamber in the compression stroke using the spark plug; and after the ignition step, a second fuel supply step of supplying the fuel into the combustion chamber in the compression stroke using the injector to increase a fuel concentration of the air-fuel mixture in the combustion chamber, wherein the injector supplies the fuel into the combustion chamber in the second fuel supply step so that the A/F or G/F of the air-fuel mixture in the combustion chamber is lower than or equal to the stoichiometric air-fuel ratio.

12. The engine control method of claim 11, wherein the spark plug makes the flame during or before a post-mid stage, where the compression stroke is divided into four stages of a pre-stage, a pre-mid stage, the post-mid stage, and a post-stage.

13. The engine control method of claim 12, wherein the spark plug makes the flame at a middle stage, where the compression stroke is divided into three stages of an initial stage, the middle stage, and a final stage.

14. The engine control method of claim 11, wherein the engine has a geometric compression ratio of 14 or more.

* * * * *